United States Patent
Davison et al.

(10) Patent No.: US 10,008,870 B2
(45) Date of Patent: Jun. 26, 2018

(54) POWERED CASE FOR PORTABLE ELECTRONIC DEVICE

(71) Applicant: Otter Products, LLC, Fort Collins, CO (US)

(72) Inventors: Thomas J. Davison, Fort Collins, CO (US); Mark W. Rau, Loveland, CO (US)

(73) Assignee: Otter Products, LLC, Fort Collins, CO (US)

( * ) Notice: Subject to any disclaimer, the term of this patent is extended or adjusted under 35 U.S.C. 154(b) by 114 days.

(21) Appl. No.: 14/661,210

(22) Filed: Mar. 18, 2015

(65) Prior Publication Data

US 2015/0270734 A1 Sep. 24, 2015

Related U.S. Application Data

(60) Provisional application No. 61/955,804, filed on Mar. 20, 2014, provisional application No. 62/013,492, filed on Jun. 17, 2014.

(51) Int. Cl.
| | |
|---|---|
| *H04B 1/3883* | (2015.01) |
| *H02J 7/00* | (2006.01) |
| *H04B 1/3888* | (2015.01) |
| *H04B 1/16* | (2006.01) |
| *H04M 1/18* | (2006.01) |

(52) U.S. Cl.
CPC .......... *H02J 7/0054* (2013.01); *H02J 7/0044* (2013.01); *H04B 1/1607* (2013.01); *H04B 1/3883* (2013.01); *H04B 1/3888* (2013.01); *H04M 1/185* (2013.01)

(58) Field of Classification Search
CPC ........ H02J 7/0068; H02J 7/007; H02J 7/0054; H02J 7/0034
See application file for complete search history.

(56) References Cited

U.S. PATENT DOCUMENTS

| | | | |
|---|---|---|---|
| 4,312,580 A | 1/1982 | Schwomma et al. | |
| 4,413,221 A | 11/1983 | Benjamin et al. | |
| 4,957,205 A | 9/1990 | Rose | |
| 5,140,310 A | 8/1992 | DeLuca et al. | |

(Continued)

FOREIGN PATENT DOCUMENTS

WO  2012074151 A1  6/2012

*Primary Examiner* — Drew A Dunn
*Assistant Examiner* — Sailesh Thapa

(57) ABSTRACT

A case for an electronic device includes a front member having an aperture for interacting with a touchscreen of the electronic device and a back member that includes a rechargeable power cell, a switched electrical interface, an electromechanical switch, and current monitoring circuitry. The switched electrical interface has an enabled mode in which electrical current is permitted to flow from the rechargeable power cell of the case to the installed electronic device and a disabled mode in which the electrical current is not permitted to flow to the installed electronic device. The electromechanical switch transitions the switched electrical interface from the disabled mode to the enabled mode. The current monitoring circuitry automatically toggles the switched electrical interface from the enabled mode to the disabled mode when the magnitude of the electrical current flowing from the case to the electronic device decreases to a predetermined value.

29 Claims, 22 Drawing Sheets

(56) References Cited

U.S. PATENT DOCUMENTS

| | | |
|---|---|---|
| 5,311,112 A | 5/1994 | Creaco et al. |
| 5,325,040 A | 6/1994 | Bogut et al. |
| 5,541,813 A | 7/1996 | Satoh et al. |
| 5,583,742 A | 12/1996 | Noda et al. |
| 5,669,004 A | 9/1997 | Sellers |
| 5,681,122 A | 10/1997 | Burke |
| 5,933,812 A | 8/1999 | Meyer et al. |
| 6,005,368 A | 12/1999 | Frame |
| 6,043,626 A | 3/2000 | Snyder et al. |
| 6,058,356 A | 5/2000 | Swanson et al. |
| 6,129,321 A | 10/2000 | Minelli et al. |
| 6,169,384 B1 | 1/2001 | Shannon |
| 6,184,654 B1 | 2/2001 | Bachner et al. |
| 6,304,459 B1 | 10/2001 | Toyosato et al. |
| 6,317,313 B1 | 11/2001 | Mosgrove et al. |
| 6,356,058 B1 | 3/2002 | Maio et al. |
| 6,388,877 B1 | 5/2002 | Canova et al. |
| 6,405,049 B2 | 6/2002 | Herrod et al. |
| 6,456,487 B1 | 9/2002 | Hetterick |
| 6,504,710 B2 | 1/2003 | Sutton et al. |
| 6,532,152 B1 | 3/2003 | White et al. |
| 6,538,413 B1 | 3/2003 | Beard et al. |
| 6,944,782 B2 | 9/2005 | Mueller et al. |
| 7,116,079 B2 | 10/2006 | Bayne et al. |
| 7,312,984 B2 | 12/2007 | Richardson et al. |
| 7,318,521 B2 | 1/2008 | Lau |
| 7,359,184 B2 | 4/2008 | Lord |
| 7,400,917 B2 | 7/2008 | Wood et al. |
| 7,403,613 B2 | 7/2008 | Liou |
| 7,612,997 B1 | 11/2009 | Diebel et al. |
| 7,782,610 B2 | 8/2010 | Diebel et al. |
| 7,888,629 B2 | 2/2011 | Heslin et al. |
| 7,889,498 B2 | 2/2011 | Diebel et al. |
| 8,013,572 B2 | 9/2011 | Rodgers |
| 8,041,029 B2 | 10/2011 | Wiegers |
| 8,286,013 B2 | 10/2012 | Chen et al. |
| 8,367,235 B2 | 2/2013 | Huang |
| 8,690,600 B1 | 4/2014 | Zeolla |
| 8,727,192 B2 | 5/2014 | Lai |
| 8,907,752 B2 | 12/2014 | Wodrich et al. |
| 9,153,109 B1 | 10/2015 | Foster et al. |
| 2002/0075003 A1 | 6/2002 | Fridman et al. |
| 2005/0188203 A1 | 8/2005 | Bhaskaran et al. |
| 2005/0189913 A1 | 9/2005 | Vitanov et al. |
| 2005/0247584 A1 | 11/2005 | Lu |
| 2005/0279661 A1 | 12/2005 | Hodges |
| 2006/0244422 A1 | 11/2006 | DiGiovanna et al. |
| 2006/0255493 A1 | 11/2006 | Fouladpour |
| 2006/0261777 A1 | 11/2006 | Li et al. |
| 2007/0052600 A1 | 3/2007 | Kamitani et al. |
| 2007/0071423 A1 | 3/2007 | Fantone et al. |
| 2007/0115387 A1 | 5/2007 | Ho |
| 2007/0138920 A1 | 6/2007 | Austin et al. |
| 2007/0146985 A1 | 6/2007 | Mick et al. |
| 2007/0158220 A1 | 7/2007 | Cleereman et al. |
| 2007/0226527 A1 | 9/2007 | Ang |
| 2008/0011917 A1 | 1/2008 | Adams |
| 2008/0164855 A1 | 7/2008 | Tam et al. |
| 2008/0269724 A1 | 10/2008 | Sarkinen et al. |
| 2008/0272741 A1 | 11/2008 | Kanamori |
| 2008/0315826 A1 | 12/2008 | Alberth et al. |
| 2008/0316687 A1 | 12/2008 | Richardson et al. |
| 2009/0017884 A1 | 1/2009 | Rotschild |
| 2009/0037284 A1 | 2/2009 | Lewis et al. |
| 2009/0051223 A1 | 2/2009 | Woo |
| 2009/0066529 A1 | 3/2009 | Fukada |
| 2009/0106567 A1 | 4/2009 | Baarman |
| 2009/0115369 A1 | 5/2009 | Lin et al. |
| 2009/0186264 A1 | 7/2009 | Huang |
| 2009/0322158 A1 | 12/2009 | Stevens et al. |
| 2010/0003950 A1 | 1/2010 | Ray et al. |
| 2010/0093412 A1 | 4/2010 | Serra et al. |
| 2010/0124040 A1* | 5/2010 | Diebel .................. G06F 1/1628 361/816 |
| 2010/0156344 A1 | 6/2010 | Inoue et al. |
| 2010/0171234 A1 | 7/2010 | Lee et al. |
| 2010/0323616 A1 | 12/2010 | Novak et al. |
| 2011/0050164 A1 | 3/2011 | Partovi et al. |
| 2011/0159324 A1 | 6/2011 | Huang et al. |
| 2011/0260681 A1* | 10/2011 | Guccione .............. H02J 7/0054 320/108 |
| 2012/0028691 A1 | 2/2012 | Koehl |
| 2012/0088558 A1 | 4/2012 | Song |
| 2012/0106037 A1 | 5/2012 | Diebel et al. |
| 2012/0178505 A1 | 7/2012 | Yang et al. |
| 2012/0303520 A1 | 11/2012 | Huang |
| 2012/0306431 A1 | 12/2012 | Li et al. |
| 2012/0314354 A1 | 12/2012 | Rayner |
| 2012/0316811 A1 | 12/2012 | Choi et al. |
| 2012/0319487 A1 | 12/2012 | Shah |
| 2013/0069583 A1* | 3/2013 | Lemelman ............ G06F 1/1635 320/107 |
| 2013/0119922 A1 | 5/2013 | Chen et al. |
| 2013/0214730 A1* | 8/2013 | Lu .......................... H02J 7/007 320/107 |
| 2013/0220841 A1* | 8/2013 | Yang ...................... A45C 11/00 206/37 |
| 2013/0262248 A1 | 10/2013 | Kim et al. |
| 2014/0065948 A1 | 3/2014 | Huang |
| 2014/0091758 A1 | 4/2014 | Hidaka et al. |
| 2014/0117921 A1 | 5/2014 | Suomela |
| 2014/0210406 A1 | 7/2014 | Na et al. |
| 2014/0217965 A1 | 8/2014 | Wiemeersch et al. |
| 2014/0253024 A1 | 9/2014 | Rautiainen et al. |
| 2014/0306654 A1 | 10/2014 | Partovi |
| 2015/0111626 A1 | 4/2015 | Bell |
| 2015/0364938 A1 | 12/2015 | Lapetina et al. |
| 2016/0079793 A1 | 3/2016 | Cho et al. |
| 2016/0211702 A1 | 7/2016 | Muratov et al. |
| 2016/0261133 A1 | 9/2016 | Wang |

* cited by examiner

POWERED CASE FOR PORTABLE ELECTRONIC DEVICE

CROSS REFERENCE TO RELATED APPLICATIONS

The present application claims priority to U.S. Provisional Patent Application 61/955,804 filed on Mar. 20, 2014, and to U.S. Provisional Patent Application 62/013,492 filed on Jun. 17, 2014, both of which are hereby incorporated by reference in their entireties.

FIELD

The present disclosure relates to cases or covers for electronic devices. More specifically, the present application relates to cases or covers that provide supplemental power to an electronic device that is encased or enclosed in the case or cover.

BACKGROUND

Portable electronic devices are commonly used for communication and entertainment purposes. Portable electronic devices include devices such as smartphones, cellular phones, mobile communication devices, computers, portable computing devices, mobile computing devices, tablet computers, cameras, video players, smart watches, audio players, electronic media readers, two-way radios, global positioning satellite (GPS) devices, and/or other types of electronic computing or communication devices, including combinations thereof. Cases, covers, protective covers, enclosures, or encasements are sometimes used with these types of electronic devices in order to protect the devices from damage due to exposure to shock, impact, dropping, puncture, dust, dirt, water, snow, rain, mud, chemicals, and/or other potentially damaging forces or elements. Cases and covers are also sometimes used to supplement the functionality of the device or to change the aesthetics of the device.

Electronic devices are commonly powered by one or more internal batteries or other power sources. Batteries enable electronic devices to be used in a portable manner and/or without being tethered to a power source. These batteries are often rechargeable. Electronic devices with more features, such as larger displays and more computing power, typically consume the available power even more quickly. When an electronic device's battery is exhausted, the device may become unusable until the battery can be recharged or until the device can be connected to another battery or a power source, such as a wall outlet. Battery capacity for electronic devices may become an issue due to factors such as power requirements of the electronic device, extended usage of the electronic device, physical space constraints of the internal battery, power requirements of peripherals attached to the electronic device, temperature extremes, unavailability of a power source for charging, decreased battery capacity due to aging of the battery, decreased battery life due to the number of charge/discharge cycles the battery has endured, and the like, as well as combinations thereof. These factors can reduce the usefulness of the electronic device because usage of the device between recharges may be limited and the user may have to discontinue use of the device due to a depleted battery until an external power source is located.

In some situations, a user may carry a spare battery for the electronic device. The spare battery can be used as a replacement for a discharged battery. While carrying the spare battery enables the user to use the device again without having to find a charging source, swapping batteries has drawbacks. First, the user must remember to carry the spare battery(s), in addition to the electronic device. Second, the user must remember to keep the spare battery in a charged state in case it is needed. Third, replacing an exhausted battery, or swapping an exhausted battery out of the electronic device for charging purposes, typically requires that the device be shut down, restarted, and/or rebooted. This process is often inconvenient and typically results in temporary loss of use, communication, and/or data. Finally, when a charging source is available, the various batteries must be swapped into and out of the electronic device in order to charge them, unless a separate host-charging device is available for the extra battery.

In addition, rechargeable batteries often have characteristics that can be affected by characteristics of the charging processes. The capacity or operational characteristics of some rechargeable batteries may change based on how the battery is charged, discharged, and/or used. For example, battery capacity or characteristics may change depending on how the battery is charged or how many times the battery has been recharged. In addition, batteries may have different charging characteristics or efficiencies depending on the present charge level of the battery. As presented herein, battery usage and charging efficiency may be improved by varying the charging pattern or algorithm for the battery.

For at least the reasons discussed above, improved power solutions for portable electronic devices are desirable. Improved power solutions may include improvements such as cases or covers with one or more supplemental power sources that are capable of providing supplemental power to an electronic device. In some situations, the case may also protect the electronic device. The supplemental power sources may have increased capacities, reduced charging times, improved methods of capturing energy from other sources, and/or methods of providing power to the electronic device in more effective or efficient manners. While a power case is beneficial to the user of the electronic device, it is often preferable that the case not add too much size or bulk to the electronic device such that it can still be easily be stored, held, and carried. Cases for electronic devices are disclosed herein that address these and other problems. Some of the techniques disclosed herein may also be implemented in apparatuses or devices other than cases, such as in a wall charger or other apparatus used to charge or supply power to an electronic device.

SUMMARY

A powered case or cover for an electronic device is provided. The case may be configured to include a front member or top member and/or may include a back or bottom member, which individually or in combination may form the case or cover. Accordingly, in various instances, the case may include a front member having an aperture or opening for interacting with a touchscreen of the electronic device and a back member that may include a rechargeable power cell, a switched electrical interface, an electromechanical switch, and current monitoring circuitry. The switched electrical interface may have an enabled mode in which electrical current is permitted to flow from the rechargeable power cell of the case to the installed electronic device and a disabled mode in which the electrical current is not permitted to flow to the installed electronic device. In such instances, the electromechanical switch may function to transition the switched electrical interface from the disabled mode to the enabled mode. Further, the current monitoring circuitry may function to automatically toggle the switched electrical interface from the enabled mode to the disabled mode when the magnitude of the electrical current flowing from the case to the electronic device decreases to a predetermined value that is associated with the electronic device being charged.

Various other embodiments and variations of the techniques are also disclosed. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

Figure 1:
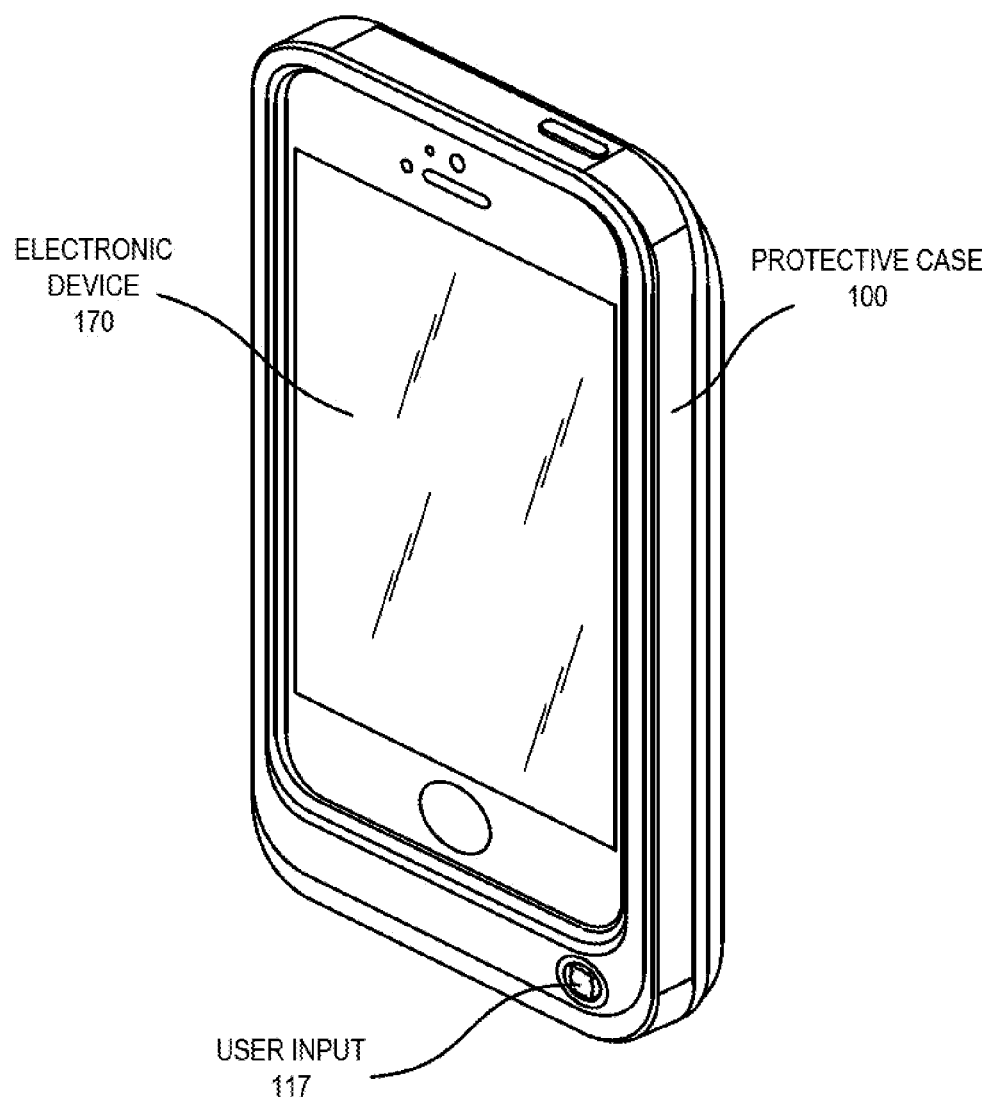
FIG. 1 illustrates a protective case and an electronic device.

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Some existing cases for electronic devices include supplemental power devices or power sources for supplying power from the case to the electronic device. Supplemental power is often provided by one or more rechargeable batteries included in the case. While many of the examples herein are discussed in the context of single batteries or power sources, it should be understood that the techniques, apparatuses, systems, and methods disclosed herein are also applicable to configurations in which more than one power source in the electronic device is used and/or more than one supplemental power source in the case is used. Cases having batteries as supplemental power sources are sometimes generally referred to herein as "battery cases" or "powered cases."

In some examples, battery cases have an electrical or electronic switch that enables a user to selectively choose or indicate whether or not power from a supplemental battery in the case is to be supplied from the case to the electronic device. The user is able to turn the switch on to enable current to flow from the supplemental battery to the electronic device and/or to the internal battery of the electronic device. The user is also able to manually turn the switch off to electrically disconnect the supplemental battery from the electronic device and/or from the internal battery of the electronic device.

Disconnecting or discontinuing the supply of current from the supplemental battery to the electronic device may be desirable for a number of different reasons, some of which are related to the charging characteristics of the battery. The recommended charging profile for many rechargeable batteries includes various phases or steps which are dependent, at least in part, on the charge status of the battery. For example, lithium ion (Li-ion) batteries are often charged using a multi-step charging process to avoid overcharging, to optimize the use of the battery, and/or to avoid potentially dangerous conditions associated with the battery.

The multi-step Li-ion charging process often includes a constant-current phase followed by a constant-voltage phase. The constant-current phase typically ends when the battery pack is about 80% full. This phase is also sometimes called the "fast charge" phase. The charger then typically switches to the constant-voltage phase to avoid the risk of overcharging or damage. During the constant-voltage phase the charging current drops as the battery is charged further and gradually decreases until charging is terminated. The remaining approximately 20% of the charging (from 80% charged to 100% charged) which takes place during the constant-voltage phase typically occurs at a proportionally slower rate than the constant-voltage phase. For instance, in the example of a typical smartphone battery, the constant current phase may take 45-90 minutes to reach 80% charge, while the remaining 20% may also take a similar amount of time, or at least a disproportionate amount of time. In addition to slower charging, the constant-voltage phase is often not as efficient relative to the fast charge phase in terms of how efficiently power from the supplemental battery is transferred to the battery of the electronic device. In some situations the constant-voltage phase may also be referred to as the "trickle charge" phase or the "saturation charge" phase.

In addition to having thresholds above which typical batteries may charge less efficiently, some types of rechargeable batteries or power sources also degrade or age more quickly the more frequently they are discharged to lower charge levels. Some varieties of Li-ion batteries degrade or age more quickly if they are frequently discharged below a minimum threshold, such as being discharged below 20% of their capacity. In other words, many batteries have a beneficial charge/discharge range within which available charging power can be used most efficiently and/or battery aging effects can be reduced.

In some configurations, a beneficial charge/discharge range of a battery may be between about 20% and about 80% charge. In other words, the battery may be used most efficiently and/or effectively if it is typically not charged above about 80% capacity and typically not discharged below about 20% capacity. Other beneficial charge/discharge ranges are possible including, but not limited to: between about 10% and about 70% charge, between about 10% and about 75% charge, between about 10% and about 80% charge, between about 10% and about 85% charge, between about 10% and about 90% charge, between about 15% and about 70% charge, about between 15% and about 75% charge, between about 15% and about 80% charge, between about 15% and about 85% charge, between about 15% and about 90% charge, between about 20% and about 70% charge, between about 20% and about 75% charge, between about 20% and about 85% charge, between about 20% and about 90% charge, between about 25% and about 70% charge, between about 25% and about 75% charge, between about 25% and about 80% charge, between about 25% and about 85% charge, between about 25% and about 90% charge, between about 30% and about 70% charge, between about 30% and about 75% charge, between about 30% and about 80% charge, between about 30% and about 85% charge, and between about 30% and about 90% charge. Other beneficial ranges are possible, including a beneficial range in which the lower end of the range is 0% charge. Some of the techniques disclosed herein are described primarily with respect to charge/discharge range of between about 20% and about 80% charge, however these techniques are also applicable to other beneficial charge/discharge ranges and may vary based on a number of factors including battery type, battery health, battery characteristics, usage profile, usage model, and/or user preferences.

While many of the examples herein are described with respect the mobile phones or smartphones, the apparatuses, techniques, and methods described herein are equally applicable to other types of electronic devices, such as smart watches, and are not to be limited to mobile phones. Furthermore, various examples provided herein discuss the providing, transfer, or delivery of power from one device to another. Other examples discuss the providing, provision, transfer, or delivery of current from one device to another. It should be understood that no functional distinction is made in the apparatuses, techniques, and methods disclosed herein with respect to delivering power or delivering current as the amount of power provided, transferred, and/or delivered at a known voltage can be mathematically determined based on the amount of current provided, transferred, and/or delivered.

Battery cases for mobile phones may include a manually operated electrical switch that allows the user to selectively enable and/or disable the electrical connection between the supplemental battery in the battery case and the mobile phone. This allows the user to manually control if/when the supplemental battery is charging the internal battery of the mobile phone. In order to make most efficient use of the supplemental battery and/or more effective use of the internal battery of the mobile phone over the long term, it may be ideal in many situations to switch or toggle the manually operated electrical switch on and off at beneficial or preferred times relative to a beneficial charge/discharge range of a given battery. For example, in order to make most efficient use of the supplemental battery and/or best use of internal battery of the mobile phone over the long term, it may be desirable to switch the manually operated switch of the battery case to the "on" position when the internal battery of the mobile phone has discharged to about 20% of capacity.

In some instances, after the supplemental battery has charged the internal battery of the mobile phone to about 80% of capacity, it may then also be desirable to switch the manually operated switch of the battery case to the "off" position in order to avoid charging of the internal battery of the mobile phone beyond about 80% charge, for the reasons discussed above. The switching on and off of the manually operated switch may also occur according to one or more of the other beneficial charge/discharge ranges, as discussed above. This cycle may continue for a period, or for as long as there is supplemental power available, as the mobile phone is used and the internal battery of the mobile phone is discharged and recharged.

While the manual switching process described above may accomplish some or all of the objectives from an electrical standpoint, it is undesirable from a user standpoint for one or more of a variety of reasons. First, a user may have difficulty understanding the process and may not understand when the manually operated switch should be toggled on and/or off. Second, the user may simply forget to toggle the manually operated switch off at the appropriate charge levels. Third, the user may choose not to toggle the manually operated switch at the appropriate charge levels because the benefit of doing so is unclear. Fourth, the user may not be able to toggle the manually operated switch at the appropriate charge levels because the user is not accessing or does not have access to the mobile phone at the appropriate times.

For one or more of the reasons discussed above, or for other such reasons, many users simply leave the manually operated power switch on battery cases in the "on" position for extended periods of time, if not indefinitely. This means that power from the supplemental battery in the phone case is applied to internal battery of the mobile phone and/or to the mobile phone for these extended periods of time, if not indefinitely. This mode of operation may present problems for multiple reasons.

First, the internal battery of the mobile phone may eventually be charged past the 80% charge threshold and may be charged all the way to the 100% charge state. As discussed previously, charging the internal battery of the mobile phone from 80% to 100% is sometimes not as quick or efficient as the charging that occurs below the 80% charge level. Consequently, the power in the supplemental battery could potentially be used more efficiently by discontinuing charging of the internal mobile phone battery at about the 80% charge level and then starting charging again after the internal battery of the mobile phone has been discharged to a lower level such as, for example, 20%, 40%, or 60% charge. In other words, even though the mobile phone is attached to the battery case, it may be desirable to refrain from providing electrical power from the battery case to the mobile phone at all times even though the internal battery of the mobile phone is not fully charged.

A second potential issue raised by leaving the manually operated switch on the battery case in the "on" position for extended periods is that the supplemental battery may be supplying power to the associated circuitry on an ongoing basis even when the internal battery of the mobile phone has reached a 100% charged state. Since the internal phone battery is fully charged, the phone may not be consuming a large amount of current from the supplemental battery, but the supplemental battery may still be powering circuitry in the battery case and/or interface circuitry associated with the mobile phone. Consequently, a small amount of power may be consumed from the supplemental battery on an ongoing basis even though the mobile phone is presently 100% charged and the consumed power is not being used to charge the internal battery of the mobile phone.

A third potential issue raised by leaving the manually operated switch on the battery case in the "on" position for extended periods is that the internal battery of the mobile phone may continue to get recharged or "topped off" from the supplemental battery each time it drops below some threshold slightly below the 100% charge state. For example, if the manually operated switch is left in the "on" position, the mobile phone may use power from the supplemental battery of the case to recharge the internal mobile phone battery each time the internal mobile phone battery drops below 95% charge. Other thresholds at which charging automatically begins are possible. This ongoing cycle between 100% charge and 95% charge, for example, may not be the most efficient use of the power available from the supplemental battery for one or more of the reasons discussed herein.

A fourth potential issue raised by leaving the manually operated switch on the battery case in the "on" position for extended periods of time is that some batteries may last longer or exhibit more desirable characteristics over time if the battery is used in a manner that utilizes a significant portion of their charge/discharge ranges. For example, a battery's lifetime may be diminished if it is frequently discharged only a small amount before being recharged, as compared to being more fully discharged, at least some of the time. This effect is also sometimes referred to as the memory effect, battery effect, lazy battery effect, or battery memory. When a battery case is attached to a mobile phone and left in the "on" position, the internal battery of the mobile phone may frequently get recharged after having only been discharged a small amount.

For one or more of the reasons discussed above, and/or for other such reasons, it may be undesirable to leave a manually switched battery case in the "on" position for extended periods of time or to leave it on indefinitely.

Battery cases can resolve some of the problems discussed above by monitoring or receiving information from the mobile phone about the charge state of the internal battery of the mobile phone and electronically controlling whether or not power is supplied from the battery case to the phone. However, this type of solution requires a data communication link or exchange of data between the battery case and the mobile phone. In this situation, the necessity of the data communication between the battery case and the mobile phone may have drawbacks including, but not limited to: potentially increased complexity and cost of electrical components in the battery case, potential added complexity and cost associated with a proprietary interface between the battery case and the mobile phone, and/or potential added complexity and cost associated with firmware and/or software that may be necessary on the mobile phone in order to establish the communication with the battery case The techniques, methods, and apparatuses disclosed herein resolve some or all of the problems discussed above. It should be understood that even though some of the examples provided herein described methods of avoiding fully charging the electronic device, or the battery of the electronic device, it may still be desirable to fully charge based on user preference or user expectation. In other words, even though charging the device above a particular threshold may be less efficient, some users may simply prefer that their device is fully charged by the case. This may be true for functional reasons such as the user wishing to have the device fully charged before taking it out of the case. This may also be true for nonfunctional reasons such as the user simply preferring to see that his or her device is fully charged or expecting to see that. However, even if a case fully charges the electronic device rather than stopping at some lower threshold, other benefits of the methods and techniques and methods disclosed herein may be realized by not continuing to top-off the charge of the electronic device after it has initially reached full charge.

FIG. 1 illustrates protective case 100 for electronic device 170 in accordance with the techniques introduced herein.

Electronic device 170 may be a cellular phone, smartphone, mobile communication device, mobile computing device, portable computing device, tablet, phablet (phone/tablet), portable computer, personal video player, electronic media reader, audio player, handheld scanner, camera, GPS device, or electronic computing or communication device of another type, including combinations thereof. In one specific example, electronic device 170 may be an APPLE IPHONE.

Protective case 100 comprises any type of protective shell, cover, covering, enclosure, bumper, sheath, encasement, and/or a member thereof used with the electronic device 170. Protective case 100 may provide protection against forces or damaging elements such as shock, impact, dropping, puncture, dust, dirt, heat, cold, water, snow, rain, mud, fluids chemicals, and/or other potentially damaging elements. In various instances, as described in further detail below, protective case 100 may be waterproof, watertight, and/or water-resistant.

Protective case 100 may encase or cover the electronic device partially or fully. For example, in various configurations, protective case 100 may attach or interface to only a single surface of electronic device 170 or may interface with a plurality of surfaces of the electronic device. In some configurations, protective case 100 may include a membrane positioned over an interactive control panel or a touch screen interface of electronic device 170 such that inputs provided by a user on an outside surface of the membrane can be detected by electronic device 170 through the membrane. In some configurations, a membrane may not be present. However, as described in further detail below, even in instances where a membrane is not present, protective case 170 may still be waterproof or water-resistant when electronic device 170 is installed. This may be accomplished using one or more gaskets, seals, or o-rings that seal between the case and a surface of the electronic device, such as a perimeter of the touchscreen of the electronic device. Such sealing may enable a remaining portion of the electronic device to be protected in a waterproof or water-resistant manner even though a portion of the electronic device is exposed.

In various instances, protective case 100 may include a supplemental power source (internal to protective case 100 and not visible in FIG. 1) that is capable of providing electrical power to electronic device 170. The term 'supplemental' power source is used in various instances to indicate that the protective case makes additional power available to electronic device 170 rather than the power being 'supplemental' relative to protective case 100 itself. In some configurations, protective case 100 includes an internal electrical, mechanical, and/or electromechanical interface (not visible in FIG. 1) for conducting the electrical power from the supplemental power source of protective case 100 to the installed electronic device 170. Examples of supplemental power sources are discussed in greater detail with respect to FIGS. 2-4.

In certain instances, protective case 100 also includes user input 117. User input 117 includes any type of device or devices for receiving an input from a user of protective case 100 and/or electronic device 170. User input 117 may include one or more of: a button, a switch, a touch sensitive device, a proximity sensor, an optical sensor, a microphone, a keyboard, a keypad, or another device for receiving input from the user, including combinations thereof. Inputs received at user input 117 may be used in determining the operation of protective case 100 as described in the examples herein.

Figure 2:
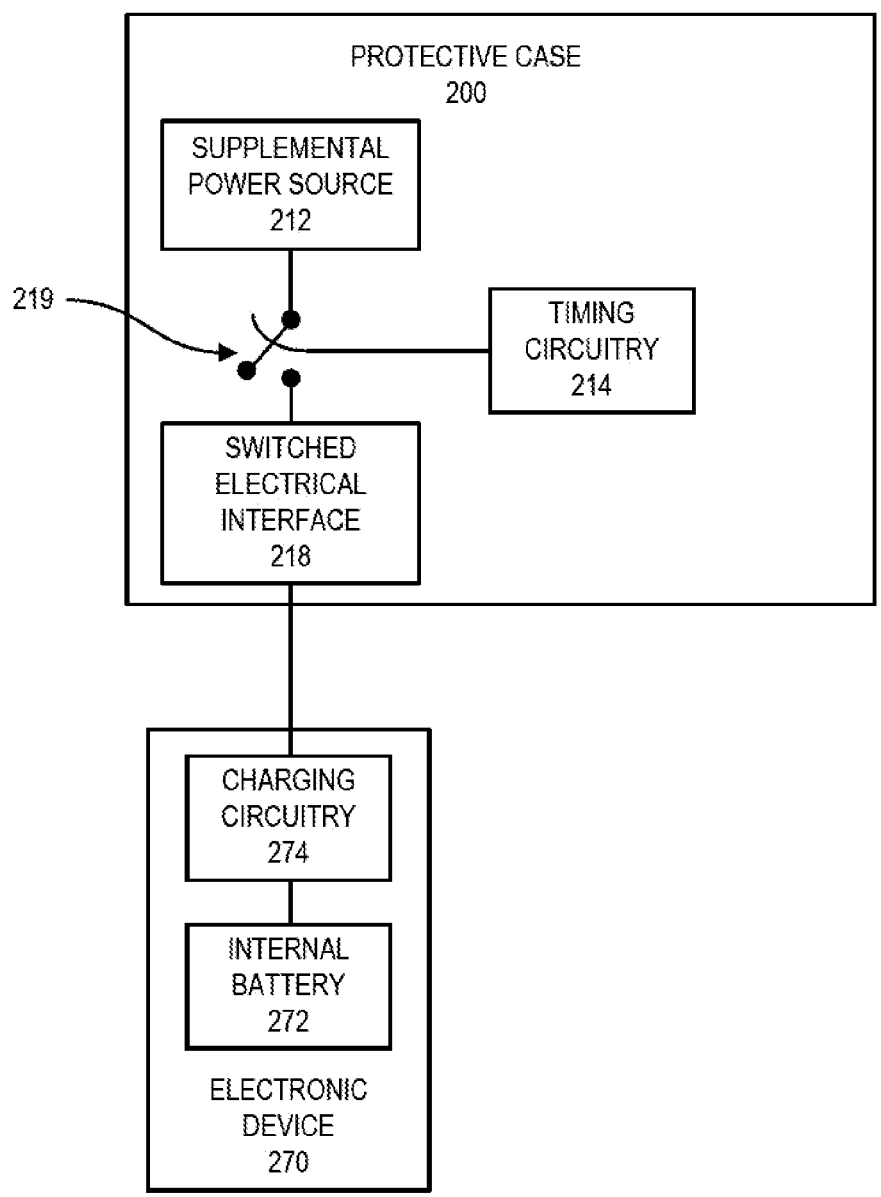
FIG. 2 illustrates a protective case and an electronic device in accordance with the techniques introduced herein.

FIG. 2 illustrates protective case 200 and electronic device 270 in accordance with the techniques introduced herein. Protective case 200 may include any of the features, elements, or functions of protective case 100.

Electronic device 270 is an example of electronic device 170. Electronic device 270 may be a cellular phone, smartphone, mobile communication device, mobile computing device, portable computing device, tablet, phablet (phone/tablet), portable computer, personal video player, electronic media reader, audio player, handheld scanner, smart watch, camera, GPS device, and/or electronic computing or communication device of another type. In one specific example, electronic device 270 may be an APPLE IPHONE, IPAD, or the like.

Electronic device 270 includes charging circuitry 274 and internal battery 272. Electronic device 270 may also include many other types of components or modules. Internal battery 272 is a rechargeable battery or other type of replenishable energy storage device that is integrated within, removably installed in, and/or attached to electronic device 270. The term "battery" is used broadly herein to refer to any type of electrical and/or chemical energy storage device. Internal battery 272 may include one or more: rechargeable batteries, fuel cells, capacitors, supercapacitors, alkaline batteries, carbon-zinc batteries, nickel-metal hydride batteries, lithium batteries, lithium ion batteries, lithium titanate cells, and/or lithium polymer batteries. Internal battery 272 can be a single device or can be a plurality of devices.

Charging circuitry 274 includes a device or group of devices for monitoring a condition of one or more batteries and/or controlling the amount of charging current delivered to the one or more energy storage devices, such as internal battery 272. Charging circuitry 274 may include a microcontroller that provides or manages battery charging and/or fuel gauging functions. Charging circuitry 274 may include one or more known or proprietary algorithms for fuel gauging and may provide information related to various parameters such as remaining battery capacity, present rate-of-use, state-of-charge (e.g., percentage remaining), battery health, run-time to empty, voltage, and/or temperature. In some configurations, charging circuitry 274 may be included in one or more other components or modules of electronic device 270.

Charging circuitry 274 may also be configured to limit or restrict the amount of current that is drawn from or flows from protective case 200 to electronic device 270. Charging circuitry 274 may also be configured to control or limit the amount of current that flows or is made available to internal battery 272. Charging circuitry 274 may also limit surges of current when power is applied to or removed from electronic device 270. In some configurations, internal battery 272 may be permanently, or semi-permanently, installed in electronic device 270, and/or may be made interchangeable with one or more other additional suitably configured batteries (not shown). Consequently, the charging processes associated with internal battery 272 may also be described as charging of electronic device 270.

Protective case 200 is an example of protective case 100. Protective case 200 includes supplemental power source 212, timing circuitry 214, and switched electrical interface 218.

Supplemental power source 212 may be any type of device, or combination of devices, capable of storing electrical power for later usage. For example supplemental power source 212 may include one or more batteries, one or more rechargeable batteries, one or more fuel cells, one or more capacitors, and/or one or more supercapacitors. In the case of a battery, supplemental power source 212 can be any suitable type of primary or rechargeable battery, such as an alkaline, carbon-zinc, nickel-metal hydride, lithium, lithium ion, lithium titanate, or lithium polymer battery. Supplemental power source 212 can be permanently or semi-permanently sealed in protective case 200. In some instances, power source 212 may be removable, interchangeable, and/or swappable with other suitably configured supplemental power sources (not shown). Supplemental power source 212 can be a single device or can be a plurality of devices.

Switched electrical interface 218 comprises an electrical interface for providing power from supplemental power source 212 to electronic device 270. In some configurations, switched electrical interface 218 may also enable communications to be exchanged between protective case 200 and electronic device 270. Switched electrical interface 218 may include a connector, a jack, a plug, a cable, or other form of electrical interface allowing passage of digital or analog information, including combinations thereof for accommodating one or both an electrical and/or a mechanical interface to electronic device 270. Switched electrical interface 218 may include active electrical components, passive electrical components, digital electrical components, analog electrical components, mechanical components, or combinations thereof.

In other configurations, protective case 200 may transfer power to electronic device 270 using wireless power transfer such as through magnetic induction or coupled magnetic resonance. In other words, both protective case 200 and electronic device 270 may include inductive coils or resonant inductive coils such that electrical power can be transferred from protective case 200 to electronic device 270.

In some situations, switched electrical interface 218 may have to meet certain interface requirements to be compatible with electronic device 270. For example, if electronic device 270 is an APPLE IPHONE, IPAD, or IPOD, electronic device 270 may have to meet the requirements of the APPLE Made for IPHONE/IPAD/IPOD (MFI) program. In addition, protective case 200 may include an authentication chip or other type of software or electronic authentication device or process that may be necessary to establish an electrical interface and/or electrical communications between protective case 200 and electronic device 270.

Protective case 200 includes switch 219 for controlling the flow of electrical current from supplemental power source 212 to switched electrical interface 218. In other words, switched electrical interface 218 is referred to as "switched" or "switchable" because switch 219 controls whether current flows to/through the device. Switch 219 is electrically controlled and permits the flow of current from supplemental power source 212 to switched electrical interface 218, and consequently, to electronic device 270. Switch 219 may be implemented as a separate component, as illustrated, or may be integrated into another device such as in supplemental power source 212, switched electrical interface 218, or another component of protective case 200. Switch 219 may include a relay, a transistor, a field effect transistor (FET), a metal oxide semiconductor field effect transistor (MOSFET), an electronic switch, and/or another device for controlling flow of electrical current.

Timing circuitry 214 includes components for implementing timing functions that control the opening and closing of switch 219. Timing circuitry 214 may include analog electrical components, digital electrical components, discrete components, integrated circuits, software, and/or firmware. Timing circuitry 214 controls when, during which time periods, and/or for how long switch 219 remains opened or closed. In other words, timing circuitry 214 controls when electrical current from supplemental power source 212 is transferred to switched electrical interface 218 and also controls how long switch 219 remains closed. While the control and operation of timing circuitry 214 with respect to the opening and closing of switch 219 is discussed with respect to FIG. 2 primarily in terms of timing, it should be understood that the control of switch 219 may be also be based on one or more other factors as described in other examples herein.

For at least some of the reasons discussed above regarding battery charging characteristics and battery life, it may be desirable to electrically isolate supplemental power source 212 from electronic device 270 for some periods of time even though protective case 200 is still electrically and/or mechanically attached to or installed on electronic device 270. For example, a user may leave protective case 200 on electronic device 270 for an extended period of time such as days, weeks, months, or years. However, it may be undesirable for supplemental power source 212 to be electrically connected to and supplying power to electronic device 270 for that entire time period. In fact, as discussed above, it may be desirable to electrically connect supplemental power source 212 to electronic device 270 and/or internal battery 272 only for specific periods of time in accordance with beneficial charge/discharge ranges of internal battery 272. In one example, when internal battery 272 is at or near a lower charging threshold (also sometimes referred to as a lower charge threshold), such as 20% charge, switch 219 may be closed or enabled such that power from supplemental power source 212 is made available to electronic device 270 and internal battery 272. In other examples, switch 219 may be closed or activated in response to an input from a user.

Timing circuitry 214 may be configured to automatically open or disable switch 219 after a predetermined period of time and without any intervention or action by a user. Timing circuitry 214 may be configured to open or disable switch 219 at a time when internal battery is expected to or predicted to be near an upper charge threshold, such as near 80% charge. Discontinuing charging of internal battery 272 at or near the upper charging threshold avoids, partially or fully, the charging of internal battery 272 in the less desirable range above the upper charging threshold. In other words, timing circuitry 214 automatically discontinues the charging of internal battery 272 at about the 80% charge threshold and reduces or minimizes the charging of internal battery in the less desirable 80%-100% charge range. As this cycle is repeated over time, internal battery 272 is beneficially operated in and used primarily within the beneficial charge/discharge range or is operated in the beneficial charge/discharge range a higher proportion of the time than it would have had timing circuitry 214 and the techniques described herein not been used. After internal battery 272 has reached a specified discharge level, switch 219 is closed to begin the charging process and the timing process described above may be repeated.

In typical use scenarios involving a traditional device charger, it may be deemed undesirable to only charge electronic device 270 to 80% of capacity, or to any charge level less than 100% charge. This is because electronic device 270 may have less use time available before it must be charged again. However, when a device such as protective case 200 remains connected to or attached to electronic device 270 for extended periods of time and/or when electronic device 270 is being used, user concerns about the frequency of recharge cycles become less important. In other words, because protective case 200 remains attached to electronic device 270, it can be used to recharge even when electronic device 270 is being used portably. Therefore, even though there is an overall increased number of charge cycles when electronic device 270 is charged to an upper charge threshold that is less than 100% charge, this increased number of charge cycles may not be inconvenient for the user and may be more efficient or otherwise better than a smaller number of charge cycles in which electronic device 270 is charged to 100% capacity.

Because the determination regarding when switch 219 should be opened is based, in this example, upon time rather than based on the actual charge level of internal battery 272, the opening of switch 219 may not occur precisely at the upper charge threshold. In other words, timing circuitry 214 opens switch 219 based on a timing estimate of how long it will take supplemental power source 212 to charge internal battery 272 to about 80% charge. However, this timing estimate is only an estimate and internal battery 272 may have actually reached some other charge level at the time when switch 219 is opened. For example, internal battery 272 may have reached 76% charge, may have reached 85% charge, or may have reached some other charge level when switch 219 is opened or deactivated based on time as described above.

The period of time in which switch 219 remains closed is referred to herein as the charging window. Because timing circuitry 214 deactivates switch 219 based on the charging window, possibly without information about the actual charge level of internal battery 272, the charging window may only be an estimate of how long it will take to charge internal battery 272 from a lower charge threshold to an upper charge threshold (e.g., from 20% charge to 80% charge). In one example, it may typically take approximately fifty minutes to charge internal battery 272 from 20% full to 80% full. Therefore, timing circuitry 214 may automatically open switch 219 or otherwise discontinue the charging process approximately fifty minutes after it has started. Other charging window durations and characteristics are possible.

The charging time of internal battery 272 may vary based on one or more of many factors including: the capacity of internal battery 272, the age of internal battery 272, the number of charge/discharge cycles internal battery 272 has previously endured, the operational state of electronic device 270, the amount of power electronic device 270 is consuming, the capacity of supplemental power source 212, the age of supplemental power source 212, the number of charge/discharge cycles supplemental power source 212 has previously endured, the current charge level of supplemental power source 212, and/or other factors, including combinations thereof. Consequently, it may be desirable for the length of the charging window to be adjustable based on one or more of these factors, in some cases automatically.

While the techniques and methods disclosed herein are primarily described with respect to protective covers for electronic devices, these techniques and methods may also be used in other devices that are used to charge an electronic device. For example, the disclosed techniques and improvements may be implemented in one or more supplemental battery packs that are used to charge an electronic device, but is not necessarily a protective case or cover for the electronic device. In addition, the disclosed improvements may be implemented in a "wall charger" for an electronic device. A wall charger is a charger for an electronic device that plugs into a wall outlet, line power, mains, or another primary source of electrical power. Even though the wall charger itself does not typically contain a rechargeable power source, the techniques disclosed herein may be implemented in a wall charger, or wall charger accessory, to manage charging of the electronic device as described herein. The techniques disclosed herein may also be implemented in another type of peripheral or accessory used to supply electrical power to an electronic device.

Figure 3:
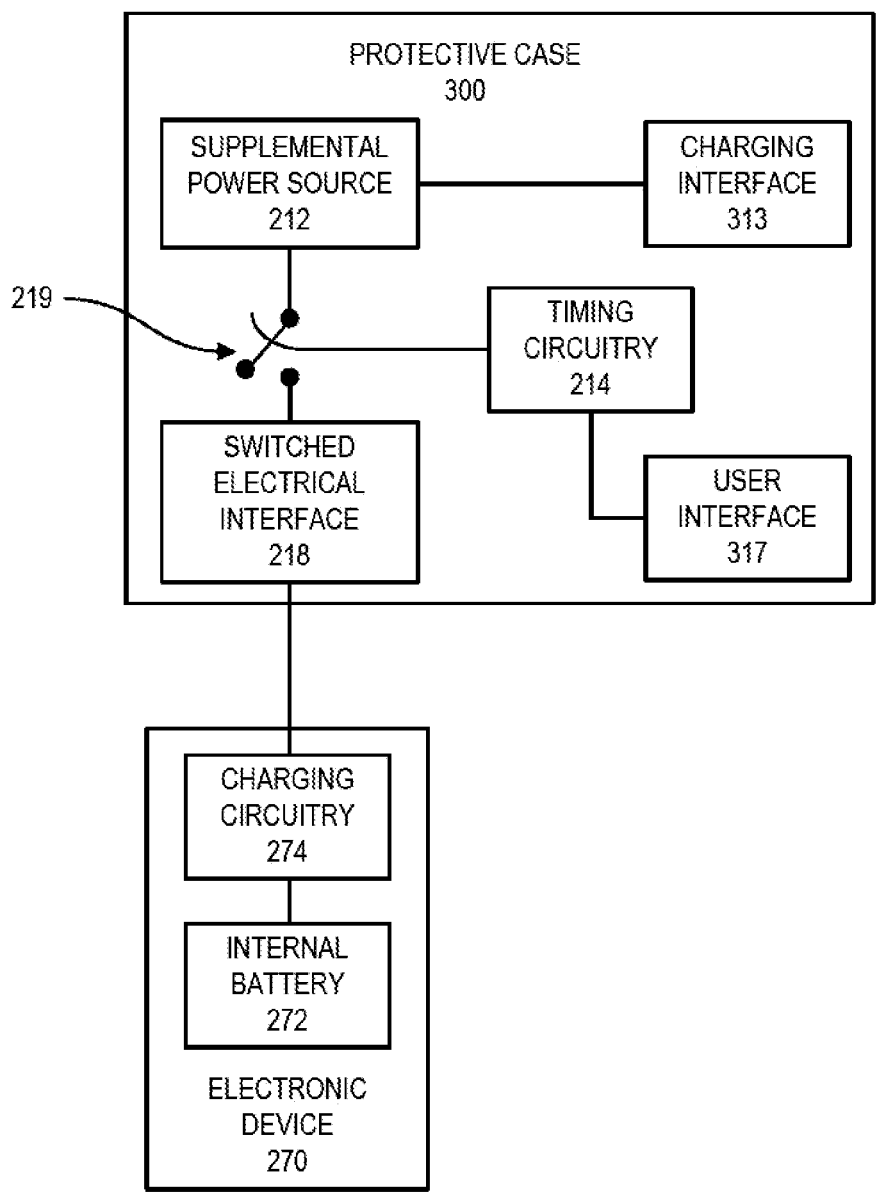
FIG. 3 illustrates a protective case and an electronic device in accordance with the techniques introduced herein.

FIG. 3 illustrates protective case 300 and electronic device 270 in accordance with the techniques introduced herein. Protective case 300 may include any of the features, functions, or elements of protective case 200 or protective case 100. Protective case 300 includes charging interface 313 and user interface 317.

Charging interface 313 comprises any type of electromechanical connector or interface that allows an external power source (not pictured) to be electrically interconnected to protective case 300 for purposes of supplying electrical power to charge supplemental power source 212. Charging interface 313 may comprise a USB connector, a mini USB connector, a micro USB connector, a cylindrical connector, a proprietary connector, or a connector of another type, including combinations thereof. Charging interface 313 may also include additional electrical conductors for communication and/or transfer of data enabling the external power source, or another device, to communicate with protective case 300. Charging interface 313 may also include one or more components for limiting, conditioning, controlling, restricting, regulating, and/or adjusting power provided from the external power source to supplemental power source 212.

In some configurations, charging interface 313 may be or include a wireless charging interface for wirelessly receiving power from an external power source through inductive power transfer and/or resonant inductive power transfer.

User interface 317 includes one or more components for receiving an input from a user of protective case 300. User interface 317 is an example of user input 117. User interface 317 may include one or more of: a button, a switch, a touch sensitive device, a proximity sensor, an optical sensor, a microphone, a keyboard, a keypad, or another device for receiving input from a user, including combinations thereof. Inputs from user interface 317 are transmitted to timing circuitry 214 and/or to one or more other devices in protective case 300. In some examples, user interface 317 may include a mechanical element accessible by a user from an outside surface of protective case 300 and an electrical element internal to protective case 300 which is activated by the mechanical element.

Protective case 300 may also include other electrical components or functions, such as one or more visual indicators to indicate a state or status of protective case 300. In addition, one more elements or functions of protective case 300 may be implemented, in whole or in part, using a microcontroller, a microprocessor, a microcomputer, a programmable logic device, a field programmable gate array (FPGA), a reconfigurable circuit, an application specific circuit (ASIC), or a combination thereof.

In one illustrative implementation of protective case 300, user interface 317 comprises a user-accessible button on or near a surface of protective case 300. When the user becomes aware that internal battery 272 of electronic device 270 is becoming low on charge, the user presses the button or provides some other type of input detectable at user interface 317. In response to the input, timing circuitry 214 closes switch 219 such that power from supplemental power source 212 is made available to electronic device 270 through switched electrical interface 218. In other words, charging begins when the user presses the button. Once power flows through switched electrical interface 218 to electronic device 270, electronic device 270 begins charging internal battery 272 using the received power. Charging continues until timing circuitry 214 automatically opens switch 219 or until switch 219 is automatically opened based on one of the other conditions or circumstances described herein.

As discussed above, timing circuitry 214 is configured to open switch 219 after a predetermined period of time. The duration of the predetermined time is chosen based on an expected time that it will take to charge internal battery 272 from a lower charging threshold (e.g., 20% charge) to a beneficial upper charging threshold (e.g., 80% charge). This approach provides several benefits. First, the user does not have to remember to manually deactivate a switch in order to avoid charging internal battery 272 above the beneficial upper charging threshold. Second, the power available from supplemental power source 212 is used more efficiently because charging is automatically discontinued without action by the user and the available power is not used to charge internal battery all the way to a 100% charged state. However, the timing may be such that internal battery 272 is charged to full, or near full, capacity.

The user input device described above may also serve other functions in addition to triggering the timed charging function. For example, the button or input device may be held down for a specified period to invoke the timed charging function, while pressing the button briefly may result in protective case 300 displaying the amount of power remaining in supplemental power source 212. The button functionality may also be different when protective case 300 is in charging mode. For example, if the button is pressed and held for the specified period of time while in the charging mode, the charging may be discontinued (e.g., protective case 300 may be transitioned to non-charging mode).

In some configurations, a software application may be executed by one or more computer processors of electronic device 270 in conjunction with the techniques disclosed herein. A software application running on electronic device 270 may monitor the charge level of internal battery 272 and actively notify the user when it is at or near a particular charge level of interest. For example, the software application may run in the background and generate a notification such as a dialog box, a message, a visual indicator, a vibration, and/or an audio indicator when the charge level of internal battery 272 drops to a lower charging threshold. The notification may remind the user to press a button or to provide another type of input at user interface 317 in order to start or trigger the charging process. The software application may include non-transitory computer processor executable instructions stored in a memory of electronic device 270, stored in a memory of protective case 300, and/or downloaded from a network, such as the Internet.

In one variation of the example above, the software application running on electronic device 270 may transmit a message to protective case 300 directing protective case 300 to start or trigger the charging process. Timing circuitry 214 may then automatically end the charging process after a specified period of time or after other conditions have been met as described in other examples herein. Communication between electronic device 270 and protective case 300 may occur through a wired connection. For example, communication between electronic device 270 and protective case 300 may occur through one or more electrical conductors associated with a cable, a plug, a jack, and/or a connector. Communication between electronic device 270 and protective case 300 may also occur through a wireless connection. The wireless connection may conform to one or more wireless communication standards including WIFI, NFC, BLUETOOTH, and/or BLUETOOTH LOW ENERGY. Communication may include data communications, electronic data communications, or any other electronic exchange of data or information, wired or wireless, between the devices, in one direction or in both directions.

In another example, communication between electronic device 270 and protective case 300 may also occur through an optical connection that may or may not include a medium for guiding optical signals between protective case 300 and electronic device 270. In yet another example, communication between electronic device 270 and protective case 300 may also be accomplished using audio signals or other audio methods. Audio methods may include use of a hardwired connection for conducting audio signals. For example, protective case 300 may include an electromechanical plug that connects with a headphone jack of electronic device 270 and receives audio signals through that connection. Audible methods may also include a wireless connection. For example, protective case 300 may include a microphone that detects audible signals generated by a speaker or buzzer of electronic device 270. In yet another example, the protective case may include an accelerometer, such as a piezoelectric accelerometer, that is configured to interpret one or more pulsed vibrations from electronic device 270 as a signal to start or stop the charging process. The pulsed vibrations may be of a specific number, duration, and/or frequency, and configured to prevent unintentional activation or inactivation of the charging process due to other random vibrations or mechanical forces experienced by the device.

In another variation, electronic device 270 may control switch 219 and/or may control the enabling/disabling of the charging process. In other words, in addition to or in place of the timing function associated with timing circuitry 214, a software application running on electronic device 270 may transmit a message to protective case 300 indicating when the charging process should stop. The communication may occur using any one or more of the methods described above. The software application may make the determination regarding when to stop the charging process based on a time window, as discussed above with respect to timing circuitry 214. The software application may also make the determination regarding when to stop the charging process based on, or in conjunction with, other factors including the charge level of internal battery 272, the amount of current consumed by electronic device 270 and/or internal battery 272, or based on an operating state of electronic device 270.

In some examples, the charging characteristics or performance of internal battery 272 may be monitored and the charging window adjusted accordingly. In other words, if the charging window is currently fifty minutes and internal battery 272 only charges from 20% charge to 65% charge during the charging window, the charging window may be adjusted to sixty minutes, sixty-five minutes, or another duration in order to better attempt to charge internal battery 272 to the upper charging threshold during the charging window. In other situations, the charging window may also be adjusted to a smaller value if internal battery 272 is being charged significantly past a desired upper charging threshold during the charging window. The charging window may be adjusted automatically by software in protective case 300, hardware in protective case 300, and/or software in electronic device 270 monitoring the charging characteristics. The charging window may also be manually adjusted by a user who observes that the charging window should be shorter or longer. The user may make these adjustments by providing input through a user interface of electronic device 270, through an interface associated with software running on electronic device 270, and/or through a user interface of protective case 300.

Figure 4A:
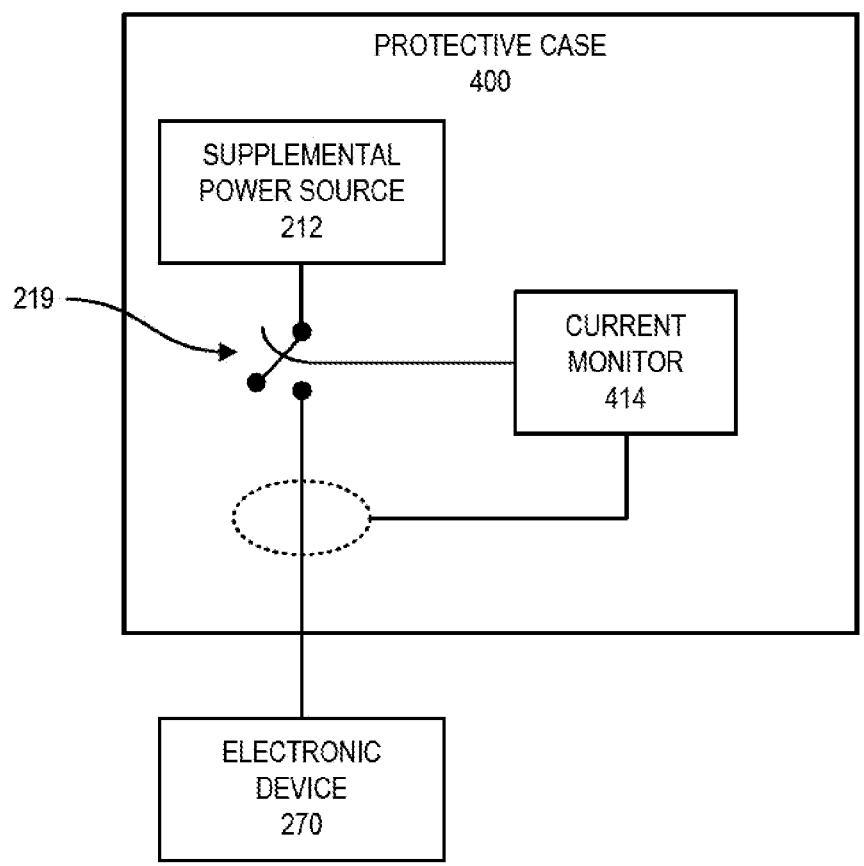
FIG. 4A illustrates a protective case and an electronic device in accordance with the techniques introduced herein.

FIG. 4A illustrates protective case 400 and electronic device 270 in accordance with techniques introduced herein. Protective case 400 may include any of the features, functions, or elements of protective cases 100, 200, or 300. Similar to protective cases 100, 200, and 300, protective case 400 provides supplemental power to electronic device 270 for purposes of operating electronic device 270 and for purposes of recharging a battery or other power storage element of electronic device 270. Also similar to protective cases 200 and 300, protective case 400 is capable of electrically or electronically enabling or disabling the supply of power using a switching device, such as switch 219. However, protective case 400 monitors the amount of current flowing to electronic device 270 and makes the switching determination based, at least in part, on the monitored current level. Current monitor 414 includes one or more electrical components for monitoring and/or measuring the flow of current to electronic device 270. The monitored/measured value is used to make a determination regarding whether switch 219 should be toggled to a different state.

In FIG. 4A, when electronic device 270 is powered off and/or when protective case 400 is not attached to electronic device 270, no current is drawn by electronic device 270 from supplemental power source 212. However, when electronic device 270 is powered on and/or connected, a significant amount of electrical current may be drawn, if available. This sudden, relatively large change in current draw may be detected by current monitor 414 and used to trigger the start of the charging window. Triggering the start of the charging window based on current draw may be an alternative to detecting the press of a button by the user to start the charging window as in previous examples. In other words, a relatively large increase in current demand by electronic device 270 from protective case 400 may indicate that charging has started and that the associated timer or charging window should be started. When electronic device 270 is attached to protective case 400 and/or powered on, charging will start and the charging window will begin. Current monitor 414 will time the length of the charging window in a manner similar to that described with respect to timing circuitry 214. Then, when the charging window is over, current monitor will disable or open switch 219 to discontinue the charging process.

In some configurations, a protective case may include both a user interface, such as user interface 317, and a current monitoring device, such as current monitor 414. Determinations regarding when to open or close switch 219 may be made based on information from one or both of user interface 317 and current monitor 414. In one example, an input received at user interface 317 may be used to determine when to start a charging cycle while data captured or gathered using current monitor 414 may be used to determine when to end a charging cycle.

In the example described above with respect to FIG. 4A, an internal battery of electronic device 270 may or may not be at or near the lower charging threshold when the timed charging process begins. In other words, in one example, internal battery 272 may be at 55% charge (or some other level) when electronic device 270 is attached to protective case 400 and the current-detection-based timing process performed by current monitor 414 begins. In this situation, the charging window may cause protective case 400 to charge electronic device 270 above the upper charge threshold, up to and including 100% charge. While continuing to charge, or attempt to charge, after the device has reached 100% may not be ideal from an absolute power efficiency/conservation standpoint, this configuration still provides at least some of the benefits described herein because there will be, statistically, at least some situations in which the internal battery of electronic device 270 is at, near, or below the lower charging threshold when the start of the charging process is detected. In addition, the protective case 400 will not continue attempting to "top off" the battery of electronic device 270 after the timed cycle has expired.

Figure 5:
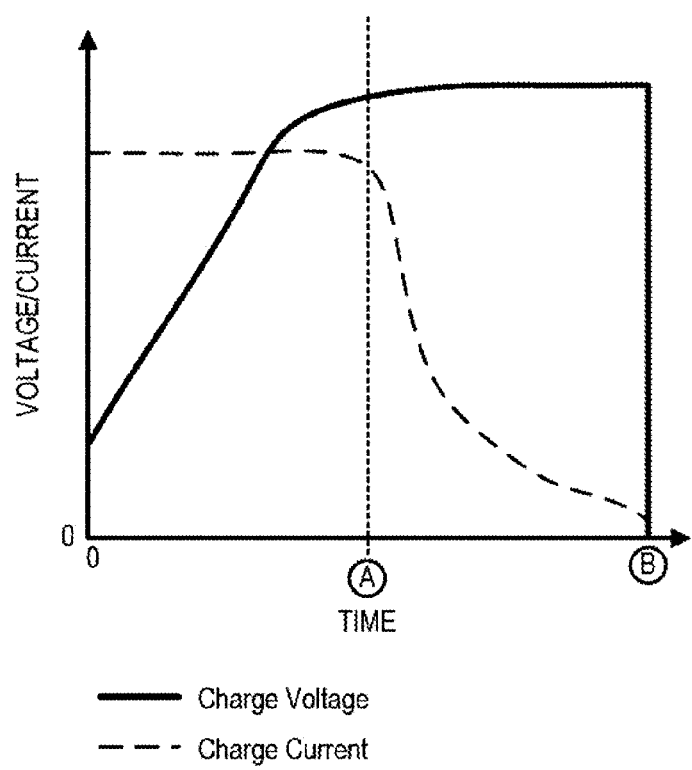
FIG. 5 illustrates voltage and current characteristics of a battery charging process.

FIG. 5 illustrates a typical charging profile of a Li-ion battery. When charging begins at time=0 a nearly constant current is applied to the battery while the voltage increases. This constant-current phase, illustrated as the time period from time=0 to time=A, and is also referred to as the fast charge phase. During the charging period from time=A to time=B, the charging voltage is constant, or nearly constant, and the charge current drops. This latter phase is sometimes referred to as the trickle charge phase. The transition between the fast charge phase and the trickle charge phase often happens when the battery is at or near 80% of its charge capacity. The battery is typically considered to be fully charged when the charging current drops to near or below a few percent of the peak charging current. Charging is typically discontinued at or near this point to avoid damage to the battery and/or to avoid potentially dangerous situations. The charge percentages discussed herein are approximations and the techniques disclosed herein are applicable to batteries or other energy storage devices having different characteristics and are also applicable to batteries or other energy storage devices having different profiles.

In another example of operation of protective case 400 of FIG. 4A, a user attaches electronic device 270 to or inserts electronic device 270 in protective case 400 for purposes of supplying power from protective case 400 to electronic device 270. Switch 219 may be in a normally closed position such that charging current flows from supplemental power source 212 to electronic device 270 after electronic device 270 is attached. Once charging has begun current monitor 414 monitors or measures the amount of current flowing to electronic device 270. Based on the monitored current flow, current monitor 414 detects when the charging of electronic device 270 is transitioning from the fast charge phase to the trickle charge phase (at or near time=A in FIG. 5). When this transition is detected, current monitor 414 may deactivate switch 219 to discontinue the charging process. As in previous examples, this causes the charging to stop at or near an upper charging threshold, such as 80% charge, thereby avoiding the less efficient, time consuming, and/or potentially damaging trickle charge phase.

In the example above, the current threshold at which charging is discontinued may be determined in one or more of several ways. In one example, the current threshold at which charging is discontinued may be a fixed value of current, such as 0.8 amperes for example. In another example, the threshold at which charging is discontinued may be a percentage of a peak charge current value, such as when the charging current drops to 80% of the peak charging current. In yet another example, the threshold at which charging is discontinued may be based on a relative change of the charging current with respect to time, such as the charging current dropping more than 10% in a period of 5 minutes. Other thresholds and methods of determining thresholds are possible and the techniques disclosed herein are not to be limited to any particular current threshold, current value, or method of determining a current threshold or current value.

If protective case 400 does not toggle switch 219 to discontinue charging as described in the above examples, electronic device 270 may be charged all the way through the trickle charge phase to reach full charge. As electronic device 270 is used and its battery is partially depleted, power from protective case 400 may periodically be used to recharge or top off electronic device 270 as long as power from protective case 400 is available to electronic device 270. Typically this ongoing recharging or topping off is not very efficient and may cause problems because it typically takes place in the trickle charge range or phase. Rather than let this topping off cycle continue as the device is used, it may be beneficial to discontinue the charging process temporarily to allow electronic device 270 to discharge significantly below the typical topping off stage before charging continues.

In yet another variation of the operation of protective case 400, electronic device 270 is attached to protective case 400 and permitted to charge to full charge. In other words, current monitor 414 does not disable switch 219 at the end of the fast charge phase as in other examples herein and permits the charging to continue all the way to the end of the trickle charge phase, or to near the end of the trickle charge phase. Current monitor 414 detects that the trickle charge phase is complete, or near complete, by detecting that the charging current has dropped to a very low value, such as to a few percent of the maximum charge current (or to a few percent of the maximum rated charging current). Because switch 219 is no longer closed, electronic device 270 will not be charged further and will not be topped off after only a small amount of power has been used, as may have occurred if the power from supplemental power source 212 remained electrically connected to electronic device 270. While charging electronic device 270 all the way to 100% charge, or near 100% charge, may not be the most efficient use of the power stored in protective case 400, it may still be desirable to do so based on user preferences or user expectations. In other words, a user may wish to have electronic device 270 charged all the way to 100%, rather than to only 80%, even if it is done so at the expense of some efficiency.

In the example above, as electronic device 270 is used further, it drops below an upper charging threshold, such as 80% charge. Once electronic device 270 has dropped below the upper charging threshold, at least a portion of any subsequent charging takes place in the fast charge phase thereby using the power available from supplemental power source 212 more efficiently. This is in contrast to supplemental power source 212 continually topping off electronic device 270 each time it drops to a few percent below full charge.

Figure 4B:
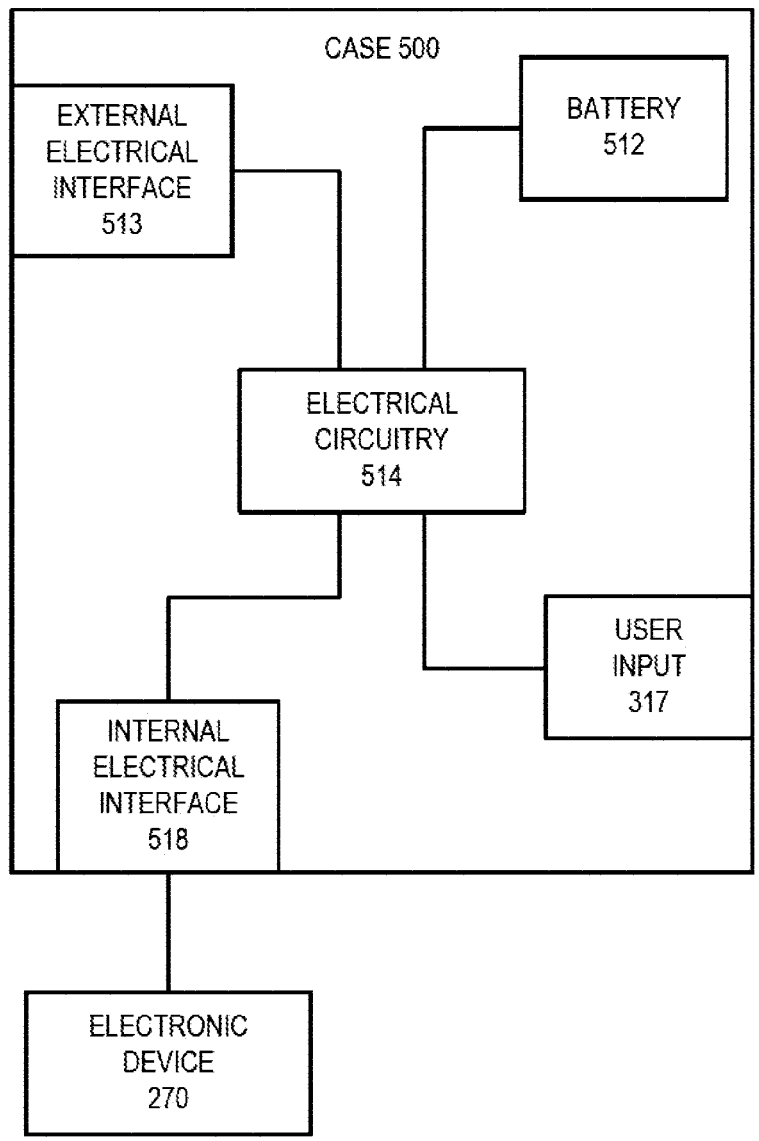
FIG. 4B illustrates a case and an electronic device in accordance with the techniques introduced herein.

FIG. 4B illustrates a case 500 and an electronic device 270 in accordance with the techniques introduced herein. Case 500 may have any of the features, functions, or elements of protective case 100, protective case 200, protective case 300, protective case 400, protective battery case 600, and/or any of the other covers, cases, or shells disclosed herein. Case 500 includes external electrical interface 513, internal electrical interface 518, user input 317, battery 512, and electrical circuitry 514.

External electrical interface 513 includes components for electrically interfacing or interconnecting, directly or indirectly, to an external power supply or power source. External electrical interface 513 may include any type of electrical connector or jack that is on or accessible from an outside surface of case 500. The connector or jack may include a USB connector, a mini USB connector, a micro USB connector, a cylindrical connector, a proprietary connector, an APPLE Lightning connector, or a connector of another type, including combinations thereof. External electrical interface 513 may have any of the features, functions, or elements of charging interface 313.

Internal electrical interface 518 includes components for electrically interfacing or interconnecting, directly or indirectly, to electronic device 270. Internal electrical interface 518 may include a USB connector, a mini USB connector, a micro USB connector, a cylindrical connector, a proprietary connector, an APPLE Lightning connector, or a connector of another type, including combinations thereof. Internal electrical interface 518 attached to and/or accessible from an inside surface of case 500. Internal electrical interface 518 may have any of the features, functions, or elements of switched electrical interface 218.

Battery 512 includes one or more rechargeable power cells and/or rechargeable power storage devices. Battery 512 may contain any of the features, functions, or elements of supplemental power source 212. While described as a "battery," battery 512 may be or include another type of power storage device including a fuel cell, a capacitor, a supercapacitor, a lithium titanate cell, and/or another type of power storage device or power generation device, including combinations thereof.

Electrical circuitry 514 includes any type of electrical components for operating or controlling case 500 or components of case 500. Electrical circuitry 514 may include passive analog components, active analog components, passive digital components, active digital components, electro optical components, electromechanical components, a microprocessor, a microcontroller, and/or a memory for storing non-transitory computer processor executable instructions. Electrical circuitry 514 may also include other components such as a printed circuit board, electrical connectors, electrical interconnects, and/or electro-mechanical mechanical components. Electrical circuitry 514 is illustrated as a single element in FIG. 4B. However, the elements or functions of electrical circuitry 514 may distributed across multiple devices or multiple locations within or throughout case 500.

In one example, case 500 includes a protective shell having a front, a back, and at least two sides. The protective shell includes a cavity that at least partially encloses electronic device 270 inside the protective shell. The protective shell includes an opening on the front of the protective shell for accessing an interactive control panel or touchscreen of electronic device 270 when electronic device 270 is installed in the protective shell. External electrical interface 513 is accessible on an outside surface of one of the sides of the protective shell. External electrical interface 513 receives electrical power from an external power source, such as a wall charger, a cable connected to a computer, a car charger, or a solar cell array. Internal electrical interface 518 is positioned inside the cavity and configured to electrically connect to electronic device 270 through an external electrical interface or connector of electronic device 270 when electronic device 270 is installed in the protective shell. Internal electrical interface 518 may include a connector rigidly mounted on the internal surface of case 500 or may be included on a flexible cable that enables it to be attached to electronic device 270 before electronic device 270 is fully inserted into case 500.

Electrical circuitry 514 is electrically interconnected, directly or indirectly, to external electrical interface 513, internal electrical interface 518, battery 512, and user input 317. Electrical circuitry 514 has a charging mode and a non-charging mode. In some situations the non-charging mode may also be referred to as a standby mode. The terms "charging" and "non-charging" are used with respect to whether case 500 is charging electronic device 270 as opposed to whether case 500 is being charged by an external source. In the charging mode, electrical circuitry 514 is configured to deliver power from battery 512 to electronic device 270. In the non-charging mode, no power is delivered from case 500 to electronic device 270. While some may take the view that a battery that operates using chemical process may not "store" electrical power in the most literal sense because the battery is storing chemicals and not electrical charge or power, from the user standpoint a rechargeable battery behaves as if it is storing power and is referred to as such herein.

Electrical circuitry 514 is adapted or configured to transition from the non-charging mode to the charging mode in response to an input received at user input 317. Electrical circuitry 514 transfers stored electrical power from battery 512 to electronic device 270 through internal electrical interface 518 if electrical circuitry 514 is in the charging mode and if case 500 is not receiving electrical power from an external power source through external electrical interface 513.

In some examples, the transferring of the stored electrical power of battery 512 is limited by an amount of current electronic device 270 will consume. In other words, case 500 makes as much current available to electronic device 270 as it will use or consume. There may still be an absolute limit or an overload limit of current supplied by case 500 which cannot be exceeded due to circuitry limitations, but case 500 may designed to supply as much current as electronic device 270, or another electronic device, may be expected to consume under normal and expected operating conditions.

Electrical circuitry 514 may monitor or measure the amount of current consumed by electronic device 270. Electrical circuitry 514 may include one or more elements similar to current monitor 414. Electrical circuitry 514 may transition from the charging mode to the non-charging mode in response to the amount of the current consumed by electronic device 270 in charging mode decreasing below a threshold value. In other words, case 500 may automatically discontinue charging electronic device 270 when the current consumed by electronic device 270 drops to a threshold or drops below a threshold. The threshold may be associated with a rechargeable battery, or other power storage device, of electronic device 270 being fully charged or substantially fully charged. In other words, the current consumed by electronic device 270 drops as the battery of electronic device 217 gets closer to being charged and once the current has dropped to a specified level electronic device 270 is treated as if it is fully charged.

Although some of the discussion presented herein explains why charging electronic device 270 to 100% may not be ideal or may not maximize efficiency, some users may still desire to have their electronic device charged to 100% rather than discontinuing charging earlier, such as at 80% or 90% of full charge. Therefore, the threshold current at which charging of the electronic device is discontinued may be a current associated with electronic device 270 being 75%, 80%, 85%, 90%, 95%, or 100% charged, or any value in between. Even though charging of the device may not be stopped at the most ideal point from a power conservation standpoint, there are still benefits in discontinuing charging once the electronic device is initially at or near 100% charge (or some other threshold value) rather than indefinitely and/or continuously "topping off" the charge of the electronic device.

In the example above, electrical circuitry 514 may also transfer electrical power received from an external power source at external electrical interface 513 to battery 512 and to electronic device 270. In other words, both case 500 and electronic device 270 may be charged simultaneously. When in this mode battery 512 is being charged and is, therefore, not delivering power to electronic device 270.

While the examples herein describe power or current as being received, delivered, and/or transferred, it should be understood that various additional functions may be performed with respect to the transferred power including power conditioning, voltage step up, voltage step down, current limiting, spike protection, surge protection, regulation, and/or overload protection. In addition, although a particular device, element, or circuit is described as delivering or transferring current or power, the current or power may not be literally conducted through that device, element, or circuit. In other words, the device, element, or circuit may directly or indirectly control one or more other devices, elements, or circuits that directly conduct the power or current.

In another example, a case for an electronic device having a rechargeable battery and a touchscreen is provided. The case includes a front member and a back member. The front member includes an aperture for interacting with the touchscreen of the electronic device when the electronic device is installed in the case. In some configurations, the aperture may also be covered with a thin, transparent membrane that still allows operation of the touchscreen through the membrane. However, in some instances a membrane may not be includes.

The back member is attachable to the front member with one or more clasping mechanisms. Together, the front member and the back member at least partially enclose the electronic device in the case. In configurations where the case is waterproof or water-resistant, a gasket or seal may be included between the front member and the back member. The back member includes one or more rechargeable power cells, a switched electrical interface, an electromechanical switch, and current monitoring circuitry. The rechargeable power cell may be any type of rechargeable battery or other power storage or power generation device, including combinations thereof.

The switched electrical interface is electrically interconnected to the electronic device when the electronic device is installed in the case. The switched electrical interface is switchable to provide electrical current from the rechargeable power cell of the case to the electronic device. The switched electrical interface has an enabled mode in which the electrical current is permitted to flow from the rechargeable power cell of the case through the switched electrical interface to the installed electronic device and a disabled mode or standby in which the electrical current is not permitted to flow from the rechargeable power cell to the installed electronic device.

In this example, an electromechanical switch can be actuated from an outside surface of the case. In some configurations, a component on the outside surface of the case may be a mechanical component that enables actuation of an electrical switch that is located inside the case. Actuation of the switch causes the case to transition the switched electrical interface from the disabled mode to the enabled mode. In other words, a user can transition the case from the disabled mode to the enable mode by pressing a button on the case. In other examples, this function may be activated by pressing a button on electronic device 270 or may be a selection available in a software app running on electronic device 270.

Continuing with the example above, the current monitoring circuitry monitors a magnitude of the electrical current flowing from the rechargeable power cell of the case through the switched electrical interface to the installed electronic device when the case is in the enabled mode. The current monitoring circuitry, and/or other electrical circuitry in the case, automatically toggles the switched electrical interface from the enabled mode to the disabled mode when the magnitude of the electrical current decreases at least to a predetermined value or threshold. The predetermined value is associated with an amount of externally supplied current the electronic device may consume, or is expected to consume, when the rechargeable battery of the electronic device is substantially charged.

In one variation of the example above, the case further includes an input power interface on an outside surface of the case, charging circuitry, and/or control circuitry. The input power interface is for receiving electrical power from an external power source, such as a wall charger. The charging circuitry is electrically interconnected to the rechargeable power cell of the case and performs and controls charging of the rechargeable power cell. The charging circuitry may include one or more particular charging algorithms, patterns, or sequences depending on the type of the rechargeable power cells. The control circuitry provides a portion of the electrical power received from the external power source to the switched electrical interface to the installed electronic device and simultaneously provides a remaining portion of the received electrical power to the charging circuitry for charging the rechargeable power cell of the case. In some embodiments, the case may be configured to provide as much current to the electronic device as it will consume using the remainder, if any, to charge the rechargeable power cell.

In yet another example, a protective cover for a portable computing device may include a protective shell that at least partially encloses the portable computing device, an external electrical connector, an internal electrical connector, a rechargeable power storage device, a button, and/or control circuitry. The external electrical connector may be accessible on or at an outside surface of the protective shell and adapted for receiving electrical power from an external power source. The internal electrical connector may be on, at, or accessible at an inside surface of the protective shell and be adapted for electrically interfacing with the installed portable computing device.

The control circuitry may be electrically interfaced to the external electrical connector, the internal electrical connector, the rechargeable power storage device, and the button, and have at least a charging mode and a standby mode. Depending on whether the control circuitry is in charging mode or standby mode and depending on whether the protective cover is receiving power from an external power source, the protective cover may operate in a variety of modes as described herein and below.

If the protective cover is receiving electrical power from the external power source, it allocates the received electrical power among the rechargeable power storage device of the protective cover and the portable computing device. A first portion of the received electrical power is transferred to the portable computing device and a second portion of the received electrical power is transferred to the rechargeable power storage device to recharge the rechargeable power storage device. In some configurations, priority may be given to the portable computing device such that all of the received electrical power is allocated to the portable computing device, at least temporarily, if the portable computing device is utilizing or will receive that much power.

If the protective cover is not receiving the electrical power from the external power source and if the control circuitry is in the charging mode, the control circuitry transfers stored electrical power from the rechargeable power storage device of the protective cover to the installed portable computing device through the internal electrical connector. The current transferred may be limited by an amount of current the installed portable computing device will consume.

Finally, if the protective cover is not receiving the electrical power from the external power source and if the control circuitry is in the standby mode, the control circuitry may transition from the standby mode to the charging mode in response to detecting actuation of the switch or button. It should be understood that other combinations of these modes and transitions between these modes are possible.

Figure 6:
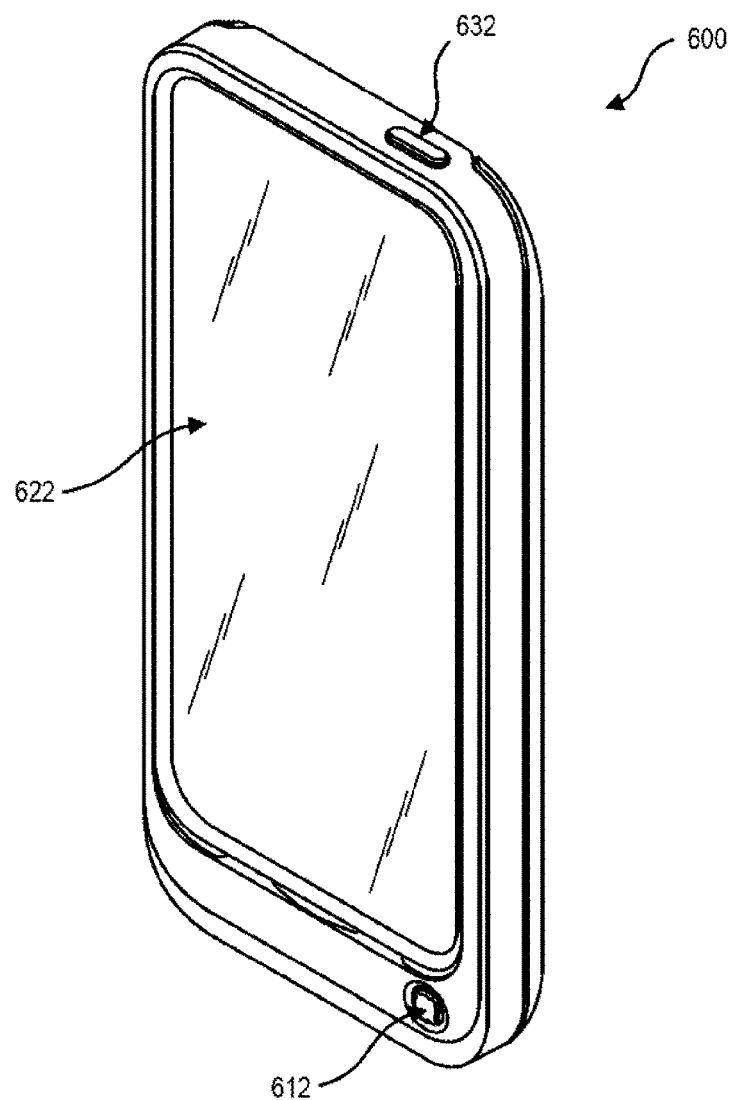
FIG. 6 illustrates a front perspective view of a protective battery case.

FIG. 6 illustrates a front perspective view of a protective battery case 600 for an electronic device, such as electronic device 170 or electronic device 270. Protective battery case 600 is an example of protective case 100, protective case 200, protective case 300, protective case 400, and/or case 500. Protective battery case 600 includes opening 622, button feature 632, and electromechanical button 612, each of which is discussed in further detail herein and below.

Figure 7:
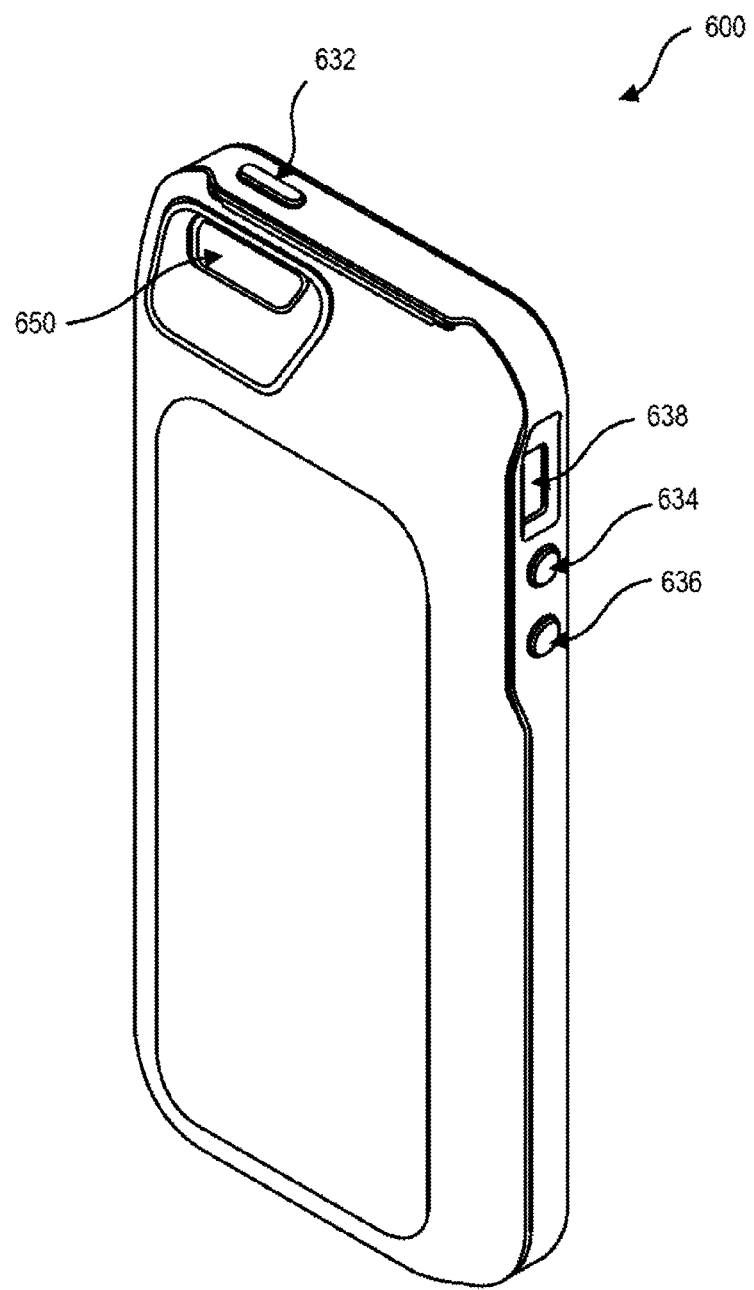
FIG. 7 illustrates a back perspective view of a protective battery case.

FIG. 7 illustrates a back perspective view of protective battery case 600. As illustrated in FIG. 7, protective battery case 600 further includes opening 638, opening 650, button feature 634, and button feature 636, each of which is discussed in further detail below.

Figure 8:
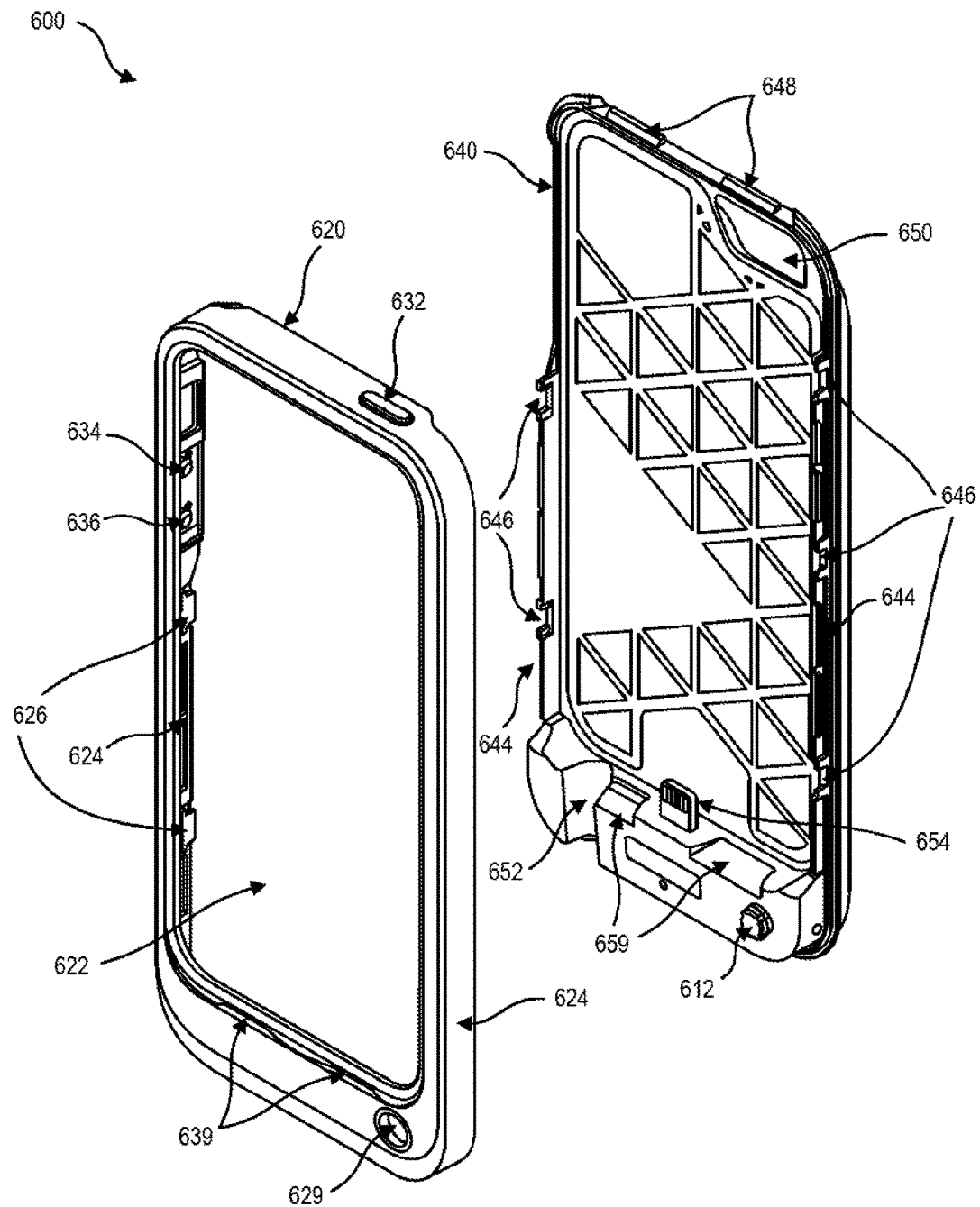
FIG. 8 illustrates a front perspective view of components of a protective battery case.

FIG. 8 illustrates components of protective battery case 600. Protective battery case 600 includes a front member 620 and a back member 640. As illustrated in FIG. 8, front member 620 includes a front surface and sides, such as side 624, which engage back member 640 to form a cavity into which an electronic device, such as electronic device 170 or electronic device 270, may be placed. Front member 620 and back member 640 may partially or fully receive, encase, or enclose the electronic device. In various instances, front member 620 may or may not include a membrane.

Front member 620 can be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), ceramic, metallized ceramic, aluminum, aluminum alloy, titanium, wood, carbon fiber, and/or any combination thereof.

Some or all of the features of the electronic device may be accessible or usable while the electronic device is in protective battery case 600. Front member 620 includes opening 622 in the front surface of front member 620 for accessing the electronic device. In one example, the electronic device may have a touchscreen display and the user may directly access the touchscreen display of the electronic device through opening 622 of front member 620 when the electronic device is in protective battery case 600. Opening 622 may or may not be covered by a membrane, film, or skin (not shown). When no membrane, film, or skin is present, the user is able to directly touch the touchscreen display through opening 622. If a membrane, film, or skin is included, it may be sufficiently thin and sufficiently optically transparent to allow the user to operate the touchscreen in a manner similar to how the device would be operated if the membrane, skin, or film was not present and the user was touching the device directly. In other words, the membrane, film, or skin may have little or no effect on the operation of the touchscreen by the user. The membrane, skin, or film may be included for purposes of protecting the display of the electronic device. In some situations, the membrane, skin, or film may be attached to or adhered to the electronic device rather than to front member 620. Alternatively or in addition to protecting the touchscreen from scratches or impact, the membrane, skin, or film may be included for sealing the protective case against elements such as, for example, dirt, water, snow, dust, or chemicals.

The membrane, film, or skin can be made of any suitable material that permits the user to interact with the display screen of the electronic device through the membrane. In one example, the membrane can be made from a thin layer of thermoplastic polycarbonate (e.g. LEXAN), polyvinylchloride, high-strength alkali-aluminosilicate thin sheet glass (e.g. GORILLA GLASS), urethane, silicon, polyethylene terephthalate (PET), or any other suitable material. The membrane can be formed using any suitable manufacturing process, such as thermoforming, casting, stretching, heating, or injection molding. In one example, the membrane can include a thin, transparent, flexible layer of polyurethane, which can serve as a clear screen protector with desirable optical qualities (e.g. high transparency and low reflectivity). The membrane can have any suitable thickness. In one example, the membrane can have a thickness of about 0.001-0.100, 0.001-0.050, 0.004-0.020, 0.005-

0.015, or 0.005-0.010 inches. The membrane can also have a micro-textured surface to reduce glare. The membrane can include an oleophobic surface coating on its outer surface to minimize the appearance of fingerprints or oily smudges on the membrane, thereby allowing the screen of the electronic device to be clearly viewed through the membrane while reducing the possibility of unwanted obstructions.

Front member 620 may also include one or more other apertures or openings for accessing the electronic device. For example, opening 638 enables a user to access a switch or control on a side of the electronic device when the electronic device is in protective battery case 600. One or more openings or apertures may exist on any side or surface of front member 620 or back member 640 for accessing a switch, control, or feature of the electronic device. In various instances, one or more of the apertures or openings may be covered, such as with a flexible or semi-flexible material, such as TPE, so as to make the aperture watertight while still allowing access and/or control of the one or more control features of the encased electronic device.

In some instances, in addition to apertures or openings, front member 620 and/or back member 640 may include one or more button features, such as button features 632, 634, and 636. These features enable a user to operate a button or control of the electronic device inside the protective cover without directly contacting the electronic device. The button features may be implemented using a variety of devices or structures.

In one example, button feature 632 is configured to engage a power switch of an electronic device. The button feature may be used to engage other types of switches of the electronic device. Button feature 632 may be designed to flex inward with respect to front member 620 and toward the inside of front member 620 when a user applies force to an outer surface of button feature 632, thereby permitting actuation of the power switch of the electronic device. Button feature 632 may be flexibly coupled to front member 620 by a flexible hinge or beam. In some configurations, the flexible hinge may be formed using a different material than the primary material used to form front member 620. During manufacturing, thin gates can be formed to permit flow of the second material to the area around button feature 632. The thin gates may be easily be broken by actuating button feature 632 during a first use. As a result, button feature 632 decouples entirely from front member 620 and stays attached to the second material, where it can easily be actuated by the user. Other methods of manufacture and other methods of flexibly attaching button feature 632 to front member 620 are possible. For example in other configurations, button feature 632 may be formed from a same material as front member 620.

In contrast to button feature 632, button features 634 and 636 may be movable to engage a button or control feature of the electronic device inside protective battery case 600 without being attached to front member 620 in a fixed manner. For example, button feature 634 and/or button feature 636 may be a separate piece which is captured within constraint features of front member 620 such that the button feature freely moves relative to front member 620, within a range of movement. In other words, button features 634 and 636 may be loosely coupled to front member 620 to allow it to move enough relative to 620 to engage a button, switch, or control feature of an electronic device inside protective battery case 600. This configuration permits the button feature to move or be actuated with respect to front member 620 while still being contained by front member 620.

Button features 634 and 636 may be manufactured as a separate piece from front member 620 and have an interference fit with respect to an opening in front member 620 such that they are initially snapped or pushed into place with sufficient force to overcome the force of the constraint feature and stay constrained after being pushed or forced into place. Alternately, as discussed above with respect to button feature 632, button feature 634 and/or 636 may be formed as part of front member 620 with thin gates, which are broken upon initial use or post molding processing, that stay loosely coupled to protective battery case 600 within a range of movement afterward.

Back member 640 comprises an inner surface and one or more sides, such as sides 644. Back member 640 couples with front member 620 to partially or fully capture, contain, encase, or enclose the electronic device. When inside protective battery case 600, the electronic device rests against the inner surface. Back member 640 may be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), ceramic, metallized ceramic, aluminum, aluminum alloy, titanium, wood, carbon fiber, and/or any combination thereof.

The inner surface may also include a soft, compliant, or compressible material to further protect the electronic device from shock, scratching, impact, and/or vibration. The material may also reduce movement and/or rattling of the electronic device inside protective battery case 600 by applying a force to the electronic device inside protective battery case 600 in response to being compressed when the electronic device is installed. The soft, compliant, or compressible material may comprise a single piece or multiple pieces and may or may not be adhered to back member 640. In some configurations, a closed cell or open cell foam material may be used. In other configurations, other compliant materials such as rubber, TPE, silicone, or the like may be used. Soft, compliant, or compressible materials may be attached to front member 620 in addition to or in place of back member 640 for similar purposes. In some instances, one or more of these materials may be molded to, molded with, or comolded with one or more portions of the case, such as in a single shot or double shot molding process.

Front member 620 and back member 640 may be formed from materials having a same color or may be formed from materials having different colors to produce a contrast effect. In addition, one or more of front member 620 and back member 640 may receive a surface treatment to provide a different texture or feel to the surface. In one example, one or more of front member 620 and back member 640 may be transparent, may be semi-transparent, may have transparent portions, or may be painted or coated with a soft touch paint to provide a soft, velvety, leathery, and/or rubbery feel. The types of treatments, finishes, or coatings may give the components increased grip, improved durability, improved scratch resistance, improved resilience to fingerprints, and/or other characteristics. In another example, front member 620 and/or back member 640 may include metallic components, may be coated with a metallic material, or may include metallic particles for altering, changing, improving, and/or re-directing electromagnetic signal transmission or reception from the electronic device.

Although not visible in FIG. 8, back member 640 may also contain one or more electrical components for implementing power related functions. For example, back member 640 may contain one or more of a battery, supplemental power source 212, timing circuitry 214, switch 219, charging interface 313, user interface 317, current monitor 314, and/or elements of computer 1200 of FIG. 12. Back member 640 may also include one or more other electrical components, electronic components, electromechanical components, and/or printed circuit boards for implementing the electrical, electronic, and/or power features described herein. Back member 640 may comprise two or more structural components that are permanently or semi-permanently attached to each other during a manufacturing or assembly process to contain or enclose any of the electrical, electronic, or electromechanical components described herein in a cavity of back member 640. In some configurations, the electrical and/or electronic components may be permanently or semi-permanently enclosed in a cavity such that they are not visible, not accessible, and/or not easily accessible to a user.

Back member 640 may also contain an electrical connector, such as electrical connector 654, for interfacing any of the electrical components of protective battery case 600 to the electronic device. Electrical connector 654 is an example of switched electrical interface 218. In one example, electrical connector 654 may be an APPLE Lightning connector. In another example, electrical connector 654 may be USB connector, a mini USB connector, a micro USB connector, another variety of USB connector, a cylindrical connector, and/or a proprietary connector. When the electronic device is inserted into back member 640, electrical connector 654 may electromechanically interface with a connector of the electronic device. When protective battery case 600 is encased around the electronic device, the electronic device is held in place as to stay engaged with electrical connector 654.

In addition to transmitting power to the electronic device, electrical connector 654 may be used to transmit data to the electronic device, receive data from the electronic device, to transmit messages to the electronic device, receive messages from the electronic device, transmit control signals to the electronic device, and/or receive control signals from the electronic device. Electrical connector 654 may be used, among other functions, to provide electrical power to the electronic device from a battery contained inside protective battery case 600 and/or from a power source external to protective battery case 600. In addition to being electrically interconnected to one or more electrical or electronic components of back member 640, electrical connector 654 may be electrically connected to an external electromechanical interface of back member 640 (not visible in FIG. 8). The electrical connection from electrical connector 654 to the external electromechanical interface may be a direct electrical connection and/or may be an indirect electrical connection through one or more of the electrical or electronic components of back member 640. Further, electrical connector 654 may contain circuitry or electrical components, other than electrical conductors, such as passive analog components, active analog components, passive digital components, and/or active digital components.

Although the various electrical and electronic features disclosed herein are primarily described as being included in back member 640, some or all of the electrical components and/or features may be contained in front member 620. In another variation, the electrical components and/or features may be distributed among front member 620 and back member 640. In addition, one or more electrical interconnections may exist between front member 620 and back member 640.

Back member 640 may also contain one or more button features, such as button features 632, 634, and/or 636, depending on where buttons or control features are located on the electronic device. Different versions of protective battery case 600 may have button features, openings, and/or other features in various locations on front member 620 and/or back member 640 to correspond to locations of buttons, switches, control features, ports, cameras, displays, and/or other interfaces on a particular model of electronic device.

Back member 640 also includes opening 652 for providing access to an interface of the electronic device, such as to a headphone jack or other electrical or mechanical interface of the electronic device. Since opening 652 provides access through a thicker portion of back member 640, opening 652 may have a channel or tunnel structure that extends from the outer surface of back member 640 to the inner surface of back member 640. Because the bottom side of front member 620 extends over opening 652 when front member 620 is attached to back member 640, front member 620 also has a cutout feature 662, illustrated in FIG. 9, which permits external access to opening 652.

Due to the length of opening 652, a specialized adapter may be required for interfacing with the electromechanical interface of the electronic device when it is inside protective battery case 600 because a typical plug may not have a rigid portion that is long enough to allow a user to insert it into the electrical device through the length of opening 652. The specialized adapter may have a rigid portion that is long enough to allow the user to mate it with the electromechanical interface of the electronic device from outside the case. The specialized adapter may also include a standard electromechanical interface similar to that on the electronic device such that conventional peripherals, such as audio headphones or headsets, can be attached to the specialized adapter and electrically interconnected to the electronic device through the specialized adapter.

Back member 640 may also contain other types of openings, such as opening 650, for a camera, camera flash, and/or related features of the electronic device. Opening 650 allows the camera, camera, flash, and/or related features of the electronic device to still be used even though the electronic device is enclosed within protective battery case 600. Opening 650 may be an open aperture between the inside and outside of protective battery case 600 or may be covered with an optically transparent, or nearly optically transparent, membrane, film, or lens that further protects the electronic device while permitting the camera, camera flash, and/or related features to remain usable. Openings may exist in other locations on back member 640 and/or front member 620, to accommodate other features of the electronic device. Any of the openings described herein may be covered with a membrane or other material, such as polytetrafluoroethylene (PTFE), to make the case water-resistant or waterproof with respect to that opening.

Protective battery case 600 may also include a camera flash isolator (not pictured). When the electronic device is installed in the protective battery case 600, the camera flash isolator can be located between a camera and a flash on a back side surface of the electronic device. In one example, the camera flash isolator can include a foam layer adhered to the inner surface of back member 640. The foam layer can provide a light barrier between the camera and the flash and can extend from a back side surface of the electronic device. When a user takes a flash photo with the electronic device, the camera flash isolator can prevent light emitted from the flash from reflecting off of the inner surfaces of protective battery case 600 toward the camera, where the reflected light could result in unwanted optical artifacts, aberrations, and/or blurriness in the image captured by the electronic device.

Front member 620 and/or back member 640 may also contain features for channeling, routing, guiding, and/or directing audio to/from the electronic device when it is inside protective battery case 600. In one example, the electronic device may have a speaker and/or microphone along its bottom edge. In FIG. 8, back member 640 contains reliefs 659 that allow audio to/from the microphone/speaker to be routed toward the front of back member rather than being blocked by the a seating surface of back member 640 where the bottom of the electronic device rests. Reliefs 659 align with openings 639 of front member 620 when front member 620 is attached to back member 640. Beneficially, audio is effectively routed to/from the front of protective battery case 600 from/to the electronic device even though the electronic device is partially or completely enclosed by protective battery case 600. It should be understood that many other configurations are possible for accomplishing similar audio effects and the configuration may vary depending on the location of audio features on the electronic device.

As illustrated in FIG. 8, back member 640 also includes an electromechanical button 612 for activating and/or controlling protective battery case 600. Electromechanical button 612 is an example of user input 117 and/or user interface 317. Electromechanical button 612 is electrically interconnected to control circuitry within back member 640. A user can press electromechanical button 612 to start or stop various functions as described herein. In one example, electromechanical button 612 may be a momentary contact electrical switch or button monitored by one or more of the other electrical components discussed herein. In addition, electromechanical button 612 may contain display features for displaying status information, as described in further detail below, regarding protective battery case 600 and/or the electronic device. Front member 620 includes an opening 629 that permits electromechanical button 612 to protrude through the front of front member 620 so it is accessible by a user when front member 620 is attached to back member 640.

Front member 620 includes clasping features 626 along sides 624 for engaging clasping features 646 along sides 644 of back member 640. Clasping features 626 engage and/or mate with clasping features 646 to attach front member 620 to back member 640. The clasping features hold front member 620 and back member 640 together until sufficient force is applied to overcome the clasping features and non-destructively pull them apart. Clasping features 624 and 646 may include any kind of clip, snap, fastener, latch, tab, cantilever snap joint, cantilever hook, compressive hook, torsion snap joint, annular snap joint, cylindrical snap joint, bayonet finger, trap, ball and socket, groove, finger, detent, and/or other permanent or semi-permanent retention mechanism for holding front member 620 and back member 640 together. It is desirable to have clasping features 626 and/or 646 within the outer surface of front member 620 and/or back member 640 such that protective battery case 600 has a smooth, or nearly smooth, outer surface that can be easily slid into a pocket, does not catch on clothing, and/or does not easily scratch other items. A user may periodically desire to detach front member 620 from back member 640 to remove the electronic device from protective battery case 600.

Figure 9:
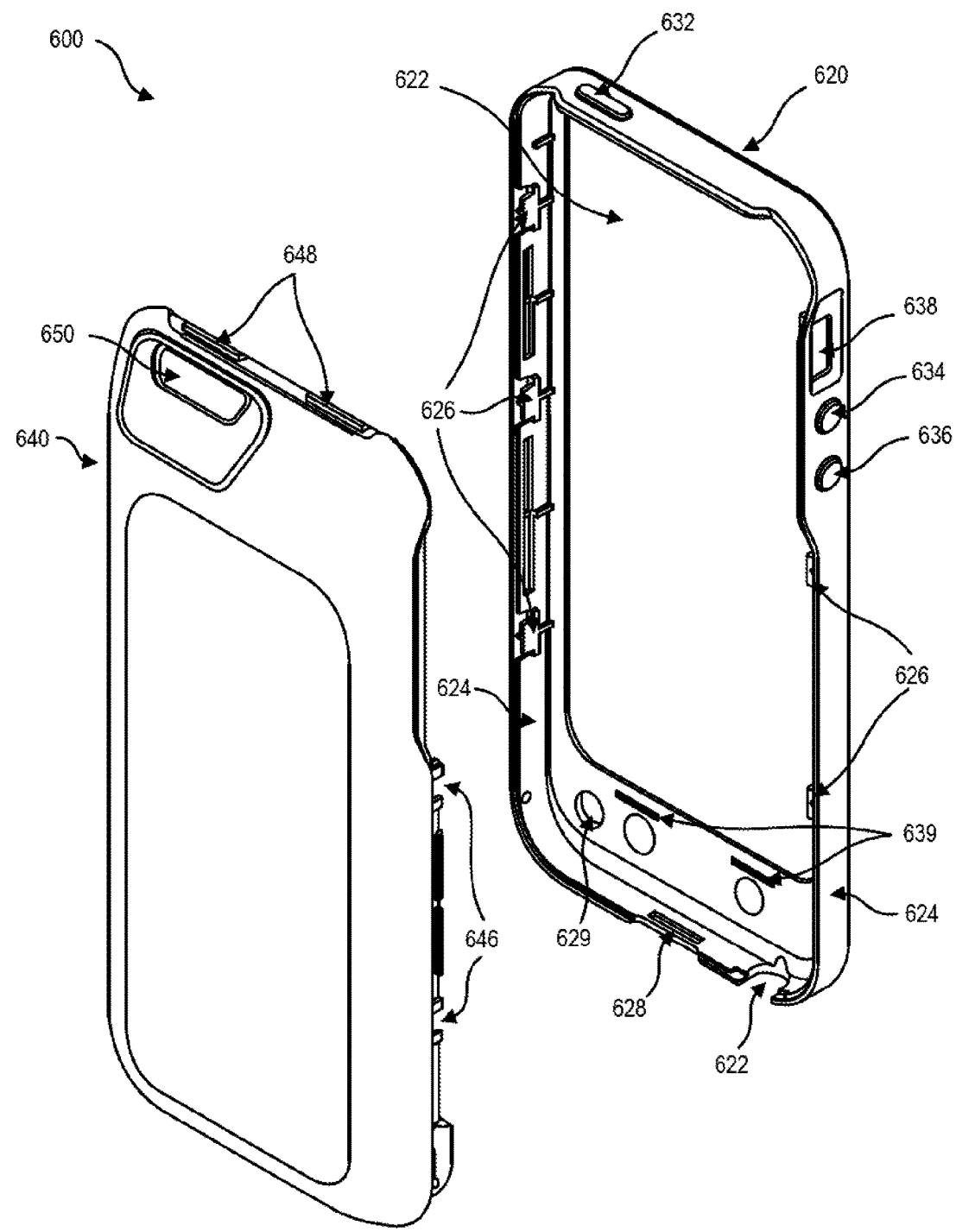
FIG. 9 illustrates a back perspective view of components of a protective battery case.

While a particular number, location, and type of clasping mechanisms are illustrated in FIG. 8, any number and type of clasping mechanisms may be placed along the perimeters of front member 620 and back member 640. Clasping mechanisms may also be present on the top and/or bottom edges of front member 620 and/or back member 640. FIG. 9 illustrates a back perspective view of the components of protective battery case 600. FIG. 9 further illustrates clasping mechanisms 628 and 648 on front member 620 and back member 640, respectively. Many other clasping mechanism positions, orientations, combinations, and/or configurations are possible.

A gasket, o-ring, and/or other sealing feature may also be used between front member 620 and back member 640 to make protective battery case 600 water-resistant or waterproof. A seal, gasket, and/or o-ring may extend around a perimeter of one or more of front member 620 and back member 640 and be compressed when front member 620 and back member 640 are attached together. Attachment of the clasping mechanisms may maintain a compressive force on the gasket to achieve or improve the sealing effect.

In some instances, a seal or gasket may be a molded in or comolded feature. In some configurations, one or both of front member 620 and back member 640 may contain an overmolded gasket. The overmolded gasket may be made of a thermoplastic elastomer. In one example, a front member can include a mating surface configured to mate against the overmolded gasket when a back member is attached to the front member. The seal formed between the overmolded gasket and the mating surface can be a water-resistant or water-proof seal. During assembly, the mating surface can provide a compressive force against the overmolded gasket thereby compressing the overmolded gasket to create the seal. In some configurations, the overmolded gasket may include a groove located between the flexible sealing surface and an inner gasket portion. The groove can permit flexing of the flexible sealing surface during assembly to provide a water-resistant or water-proof seal between the flexible sealing surface and the sealing surface. In some configurations, the inner gasket portion may not seal against the sealing surface of the front portion. Instead, the inner gasket portion may improve manufacturability of the overmolded gasket. The inner gasket portion can also enhance adhesion between the overmolded gasket and the inner back surface of the back portion due to the greater contact area between the overmolded gasket and the inner back surface. Consequently, the inner gasket portion may enhance durability and longevity of the overmolded gasket.

In the case of water-resistant or water-proof applications, one or more of the openings or apertures discussed herein may be covered with a material that allows sound and/or air to pass between the outside of protective battery case 600 and the inside of protective battery case 600 while maintaining the water-resistant or water-proof characteristics of the case (e.g., GORE-TEX).

In addition, one or more of the openings or apertures discussed herein may be covered with a plug, port cover, and/or bung to protect against water, snow, dust, or other elements when the aperture or opening is not in use. In one example, the port cover can be configured to cover and seal an opening in either the front member or the back member. The port cover may include a gasket or o-ring configured to seal against a surface of the opening to provide a water-resistant or water-proof seal when the port cover is in a closed position. When in an open position, the port cover can provide access to features of the personal electronic device through the opening. In one example, the port cover can be attached to the case by inserting a feature of the port cover into a slot in the front or back member. The port cover can include a hinge to permit flexing of the first port cover during opening and closing. In one example, the hinge can be a portion of the port cover having a relatively thinner cross-sectional area than adjacent portions of the port cover allowing it to flex away from the port opening. The port cover may be inserted into the opening by pressing it into the opening. The port cover may stay in place as a result of a snug fit with the opening or an interference opening. In another example, the port cover may be a bung that is threaded into either the front member or the back member to cover an opening. The opening and the bung may have a gasket and seating surface that meet to seal the opening when the bung is screwed into place. The bung may also contain a tether to the protective case or to a cable or adapter such that the bung is not misplaced when not in use.

In some configurations, one or more of front member 620 and/or back member 640 may each include a first layer and a second layer. In one example, the second layer can be overmolded onto the first layer. The first layer can be made of a relatively hard material and the second layer can be a relatively soft material. The first layer can be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), ceramic, metalized ceramic, aluminum, aluminum alloy, titanium, wood, carbon fiber, or any combination thereof. The second layer can be made of any suitable material, such as a thermoplastic elastomer. The first layer can bolster the structural rigidity of the case to enable the case to withstand a moderate drop (e.g. from a height of about 3-6 feet) without experiencing significant physical deformation upon impact, thereby ensuring that unwanted separation of the front member and the back member does not occur at impact. Separation is undesirable, since the electronic device will typically exit the cavity of the case and then be unprotected and vulnerable to scratching, shattering, or water damage as it makes direct contact with the ground or water.

The second layer can be made of a relatively soft but durable material that dampens and dissipates impact energy associated with a moderate drop, thereby reducing the magnitude of shock forces transmitted to the electronic device housed inside the protective case at a moment of impact and shortly thereafter.

Front member 620 and/or back member 640 can include a plurality of relatively soft protrusions on their inner surfaces. The protrusions can improve the fit of the electronic device within the cavity. For example, respective protrusions can compress toward the inner surfaces of the cavity when the electronic device is installed in the cavity, thereby taking up any gap between the device and the inner surfaces of the cavity. This may permit the cavity to be manufactured with a tolerance that is less restrictive than a tolerance that would be required if the cavity were required to fit snugly around the electronic device. This approach reduces manufacturing costs since a higher percentage of manufactured components may meet design specifications, thereby reducing the number of rejected parts and/or reducing waste.

In addition to manufacturing considerations, the protrusions may isolate the electronic device from the inner surfaces of the cavity. As a result, an air gap is provided around the side surfaces of the electronic device. The air gap may prevent impact forces from being transmitted directly from the first layer to the electronic device. The air gap may also prevent side surfaces of the electronic device from becoming marred as a result of frequent contact and minor positional shifting relative to the harder and less forgiving surfaces of the cavity. Consequently, degradation of the exterior surface of the electronic device over time is reduced. In addition, the protrusions may reduce the tendency for vibrations or movement to occur between the electronic device and hard surfaces of the case such as, for example, form handling of the device or when audio is being produced by a speaker of the electronic device.

While many of the examples herein are described with respect to a protective battery case having a front and back member, other configurations for forming a protective case having a cavity into which an electronic device is placed. For example, the case may have top and bottom portions that enclose the electronic device rather than front and back portions.

Figure 10:
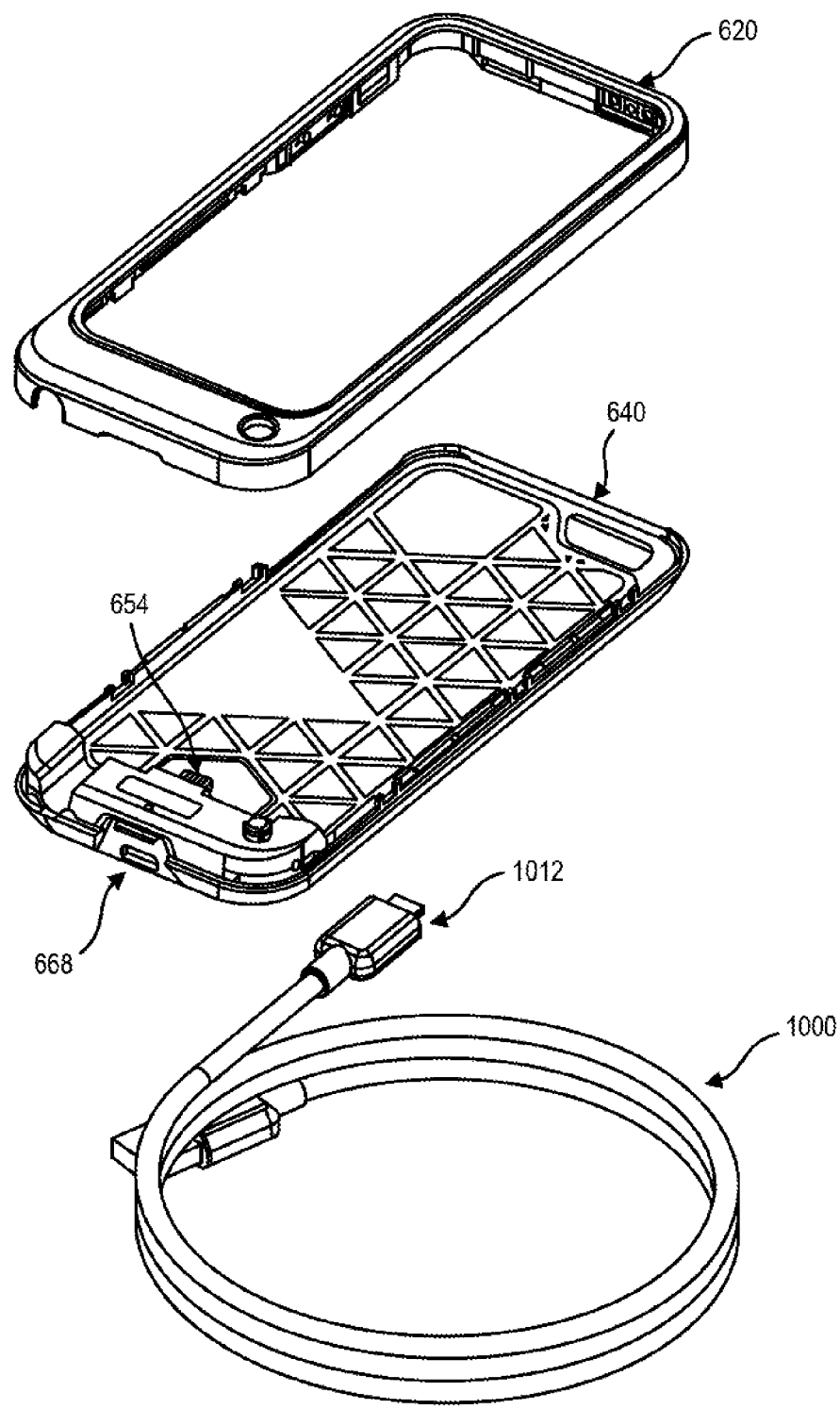
FIG. 10 illustrates a top perspective view of components of a protective battery case and an interface cable.

FIG. 10 illustrates a top perspective view of protective battery case 600 and an interface cable 1010. As explained in the discussion above, protective battery case 600 includes front member 620 and back member 640. Back member 640 includes electrical connector 654 for connecting to an electronic device inside protective battery case 600. Back member 640 also includes external electrical interface 668 which is not visible in FIGS. 8 and 9. External electrical interface 668 is an example of charging interface 313. External electrical interface 668 enables protective battery case to interface to an external device for purposes of one or more of: receiving electrical power from the external device, establishing communication with the external device, receiving data from the external device, and transmitting data to the external device. The external device may be a power supply, a power adapter, a power source, a wall charger, a charging station, a network, a vehicle, a computer, or another electronic device.

Protective battery case 600 may be attached to the external device or power supply using an electrical cable such as cable 1010. Cable 1010 includes an electromechanical connecter 1012 that mates with electrical interface 668. Electromechanical connector 1012 may comprise a USB connector, a micro USB connector, a mini USB connector, an APPLE 30 pin connector, an APPLE lighting connector, or a proprietary connector. Cable 1010 may be used to supply electrical power to protective battery case 600, to an electronic device inside protective battery case 600, or to both.

Some battery cases only provide a power connection to the case and/or electronic device at electrical interface 668. In other words, power may be supplied to the case or electronic device through electrical interface 668 but data communication with electronic device through electrical interface 668 is not possible. In this situation, the electronic device must often be removed from a battery case in order to synchronize data between the electronic device and another computer using a wired connection. However, electrical interface 668 of protective battery case 600, in conjunction with other components of protective battery case 600, may provide a wired data connection to the electronic device through electrical interface 668. Beneficially, this allows the electronic device to exchange data with or synchronize with a computing device, the Internet, the cloud, or another system through a cable, such as cable 1010, without having to be removed protective battery case 600.

Figure 11:
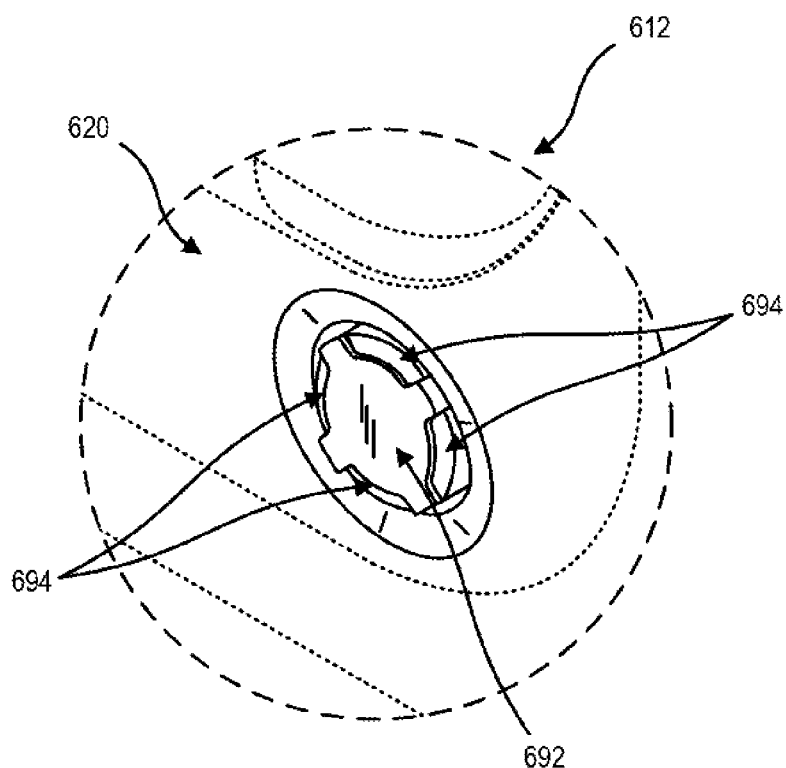
FIG. 11 illustrates a button of a protective battery case.

FIG. 11 illustrates a close up view of one example of electromechanical button 612 on front member 620. In this example, electromechanical button 612 includes a core portion 692 and light pipes 694, which may also be referred to in some cases as optical elements. Core portion 692 of electromechanical button 612 is the primary portion of electromechanical button 612 that a user presses to activate or provide input to protective battery case 600 using electromechanical button 612. Electromechanical button 612 may comprise the mechanical portion which is visible in FIG. 11 that transmits force to an electrical switch mounted inside battery case 600. In some configurations, the electrical switch may be a momentary contact electrical switch electrically interconnected to one or more other electrical components of protective battery case 600.

Light pipes 694 are attached to core portion 692 and optically conduct light from a light source below electromechanical button 612 to the surface of electromechanical button 612 for viewing by a user of protective battery case 600. The light source may be one or more light emitting diodes (LEDs) in a fixed mounting inside protective battery cover 600. One of the benefits of using light pipes 694 is that the light can be emitted from the movable portion of electromechanical button 612 without the light sources (e.g., LEDs) themselves having to move or be mounted on a movable structure. The movement of electromechanical button 612 may be small enough that light pipes 694 are able to effectively conduct light from respective LEDs regardless of whether electromechanical button 612 is in a default resting position or in a pressed or activated position.

While electromechanical button 612 is illustrated in FIG. 11 with four light pipes 694, more or fewer light pipes are possible. In addition, while light pipes 694 are illustrated around a perimeter of electromechanical button 612, they may be arranged in another configuration or orientation relative to each other and/or relative to electromechanical button 612. Light pipes 694 need not be attached to or adjacent to electromechanical button 612. The illustrated configuration of light pipes is beneficial from a manufacturing and assembly standpoint because electromechanical button 612, light pipes 694, and the associated printed circuit board, LEDs, and other electronic components can be part of a single assembly which simply sticks through a single opening in the protective battery case. In other words, other than the single opening, front member 620 and back member 640 do not need to include electronics, circuitry, LEDs, light pipes, or multiple separate openings for light pipes, LEDs, and or buttons. However, the techniques disclosed herein may be implemented in a protective case in which light pipes are not used or a protective case in which light pipes are not attached to the button.

Light pipes 694 may be used in a variety of manners to communicate status information or other information to a user and may do so relative to the user's interaction with electromechanical button 612. Following is one example of a format which may be used for communicating status information. However, it should be understood that many formats are possible and the apparatuses, techniques, and methods disclosed herein are not to be limited to any particular format.

In this example, the status of the battery of protective case 600 can be viewed by briefly pushing electromechanical button 612. The current charge status of the battery is indicated based on the number of LEDs illuminated, as viewed through light pipes 694 (e.g., three of the four LEDs lit represents a case charge level of approximately 75% or a charge level of greater than 50% and up to 75%). If the button is pressed for a longer period of time (e.g., 1-3 seconds) charging of the electronic device by the battery case begins. In some configurations, the LEDS may flash in a circular pattern in order to signify that the charging process has begun. At this time, the electronic device may also indicate that the charging process has begun. The battery case will continue charging until it is determined that charging of the electronic device is complete, or substantially complete, after which charging is automatically discontinued. The button may also be pressed again to stop the charging process. The above is one example of how modes may be changed using the button and how status may be indicated, many other configurations are possible.

In some configurations, any of the powered cases described herein may be configured for powering devices other than an encased electronic device. For example, a battery or other supplemental power source of one of the cases disclosed herein may be used to charge another portable electronic device that is not inside the case, such as a smartwatch, a portable music player, a hearing aid, wireless headphones, or a smartphone that is not inside the case. One or more of these other devices may be charged in addition to, or alternatively to, charging the electronic device inside the case. The case may include another electrical connector or interface on an outside of the surface of the case for providing this charging power out to another device.

In some configurations, any of the powered case described herein may be configured such that one or more batteries or other supplemental power sources included in the case is user-removable and/or user replaceable. This configuration may permit the user to swap out a discharged battery and replace it with a charged one rather than waiting for the charging of the discharged battery. This configuration may also enable easy replacement of a non-functioning or poorly functioning battery.

Figure 12:
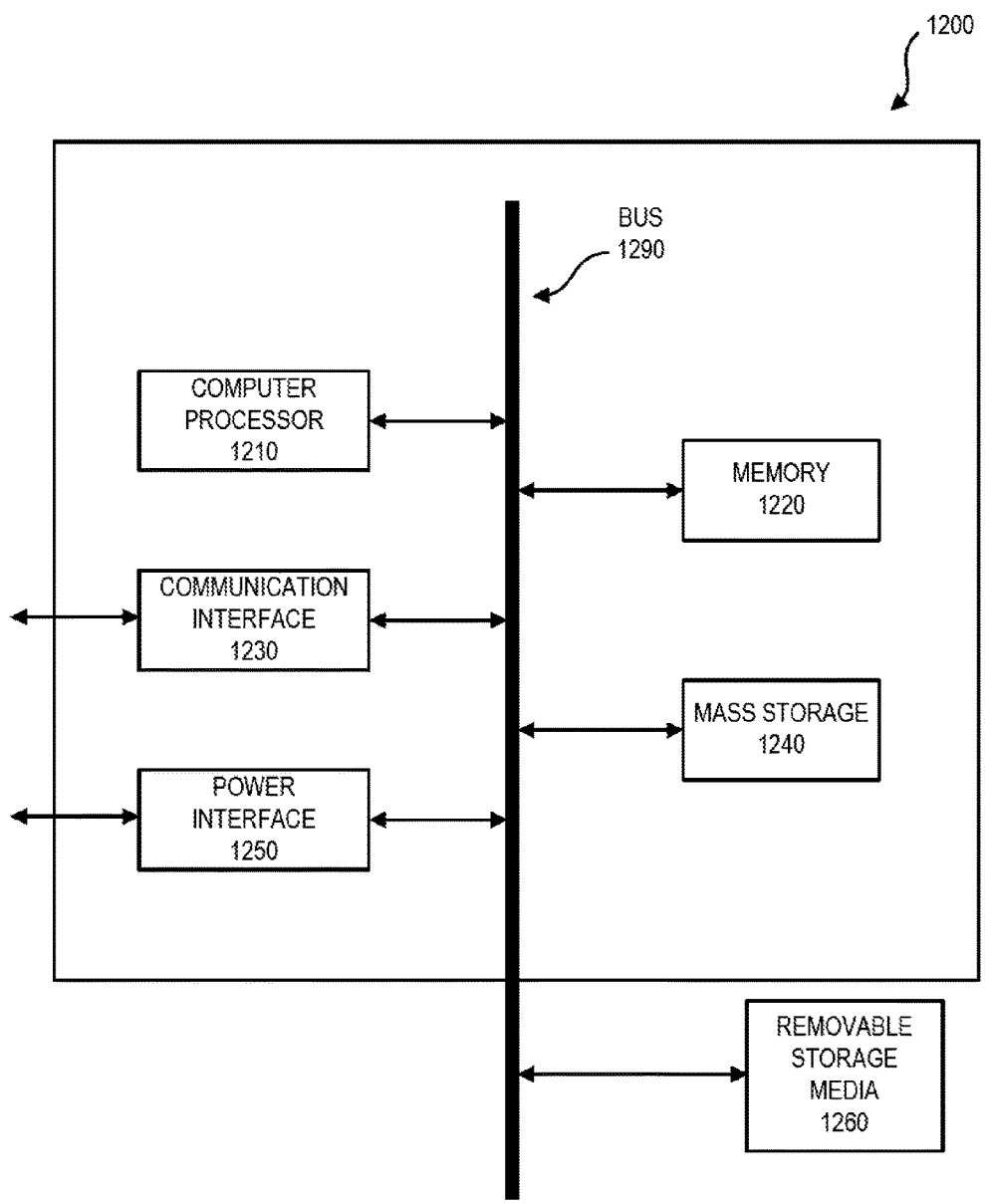
FIG. 12 illustrates a computer system which may be used in conjunction with the techniques introduced herein.

FIG. 12 illustrates computer system 1200 with which some embodiments of the techniques disclosed herein may be utilized. One or more elements of the cases or protective cases disclosed herein may be implemented using one or more computer systems, such as computer 1200. Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware and software and/or firmware. According to the example of FIG. 12, computer system 1200 may include a bus 1290, a computer processor 1210, a communication interface 1230, a memory 1220, a mass storage 1240, a power interface 1250, and/or a removable storage media 1260.

Computer processor 1210 can be any computer processor, microprocessor, microcontroller, analog computing circuitry, special purpose processor, programmable logic array, or programmable logic device. Computer processor 1210 may also interface to a coprocessor.

Communication interface 1230 can be any type of interface for communicating with a person, a device, or a network. Communication interface 1230 may be configured for communicating using a wired connection, a wireless connection, audio signals, light waves, infrared, or a combination thereof. Communication interface 1230 may be configured for communicating with or over a network such a Local Area Network (LAN), Wide Area Network (WAN), or any network to which computer system 1200 connects. Communication interface 1230 may also be configured to communicate with an electronic device such as a cellular phone, a smartphone, a tablet, a laptop computer, a server, or a digital audio device. The various functions of communication interface 1230 may be distributed across multiple communication interfaces. In one example, communication interface 1230 is a USB interface. In addition, communication interface may include a user interface such as user input 117, user interface 317, and/or electromechanical button 612.

Memory 1220 can include random access memory (RAM), or any other type of dynamic data storage device commonly known in the art. Memory 1220 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or machine-executable instructions for computer processor 1210 or for another computer processor. In some configurations, memory 1220 may be contained within computer processor 1210 or within one of the other elements of computer system 1200.

Mass storage 1240 can include one or more persistent mass data storage devices or modules that may be used to store data, information, and/or instructions. Mass storage 1240 may include a hard drive, a tape drive, an optical drive, flash memory, a micro electromechanical storage device, or a combination thereof.

Power interface 1250 can be any type of interface for receiving and/or transmitting electrical power. Charging interface 313 and external interface 668 are examples of power interface 1250, although other examples are possible. The functions of power interface 1250 may be spread across multiple power interfaces. The functions of power interface 1250 may also be combined into a single connector and/or interface with communication interface 1230. For example, the functions of communication interface 1230 and power interface 1250 may both be implemented in the form of one or more USB interfaces.

Removable storage media 1260 can be any kind of external data storage device including a hard drive, a memory card, a subscriber identity module (SIM) card, flash memory, an optical drive, a tape drive, a micro electromechanical storage device, or a combination thereof.

Bus 1290 communicatively couples the elements of computer system 1200, as well as removable storage media 1260. Bus 1290 may conform to an industry standard bus architecture and protocol or may use a proprietary architecture and/or protocol.

Any of the techniques disclosed herein may also be implemented in the form of a method. Any of these methods may be implemented in the form of computer instructions that are executable on one or more computers, computer processors, microprocessors, or microcontrollers. Furthermore, the computer instructions may be split into two or more sets of instructions that are executed on different devices. For example, one set of instructions may be executed on a microprocessor of one of the cases disclosed herein while another set of instructions is executed by an electronic device associated with the case.

Figure 13:
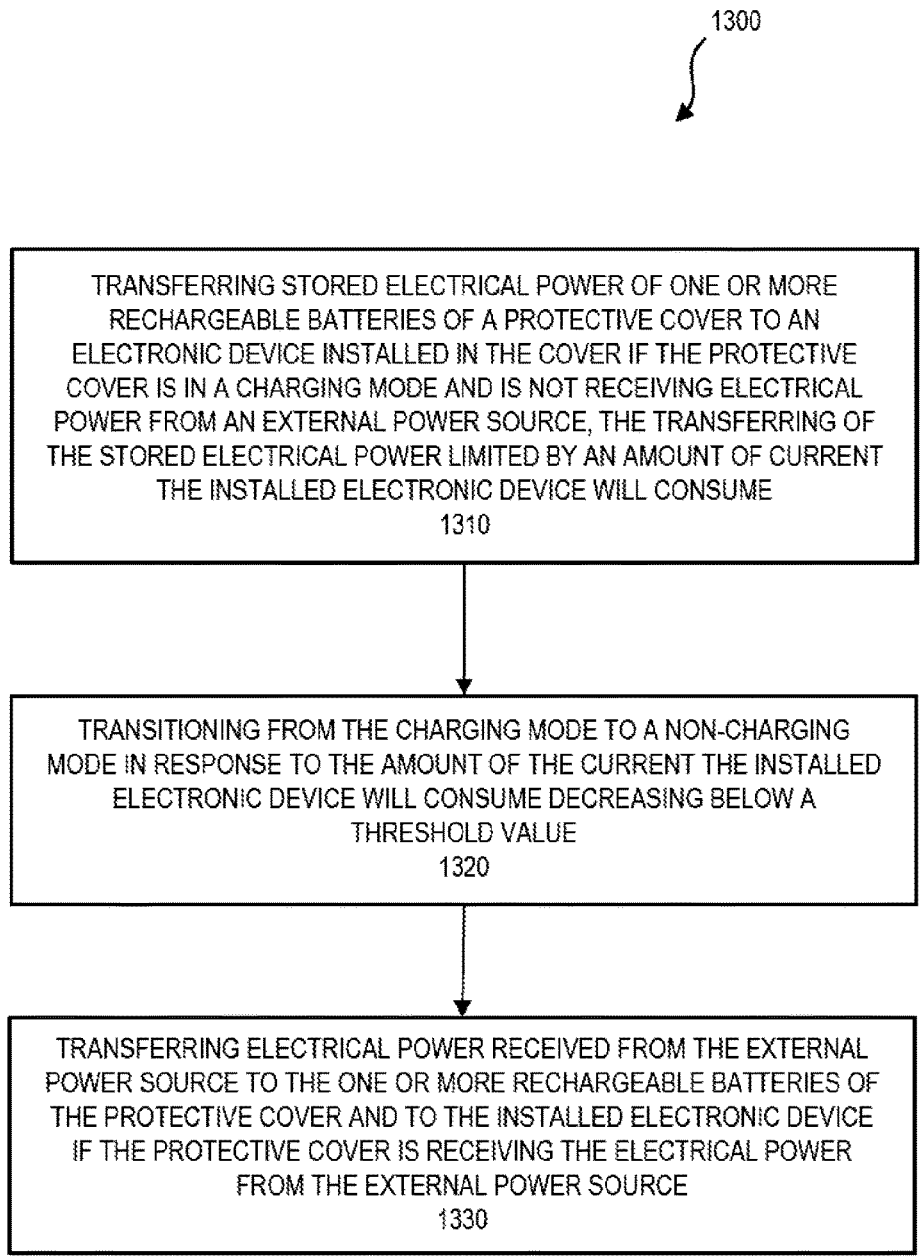
FIG. 13 illustrates a method of providing supplemental electrical power to a portable electronic device.

In one example, FIG. 13 illustrates method 1300 of providing supplemental electrical power to a portable electronic device having a rechargeable battery. At step 1310, method 1300 includes transferring stored electrical power of one or more rechargeable batteries of a protective cover to an electronic device installed in the cover if the protective cover is in a charging mode and if it is not receiving electrical power from an external power source. The transferring of the stored electrical power is limited by an amount of current the installed electronic device will consume. At step 1320, method 1300 includes transitioning from the charging mode to a non-charging mode in response to the amount of the current the installed electronic device will consume decreasing below a threshold value. At step 1330, method 1300 includes transferring electrical power received from the external power source to the one or more rechargeable batteries of the protective cover and to the installed electronic device if the protective case is receiving the electrical power from the external power source.

Figure 14:
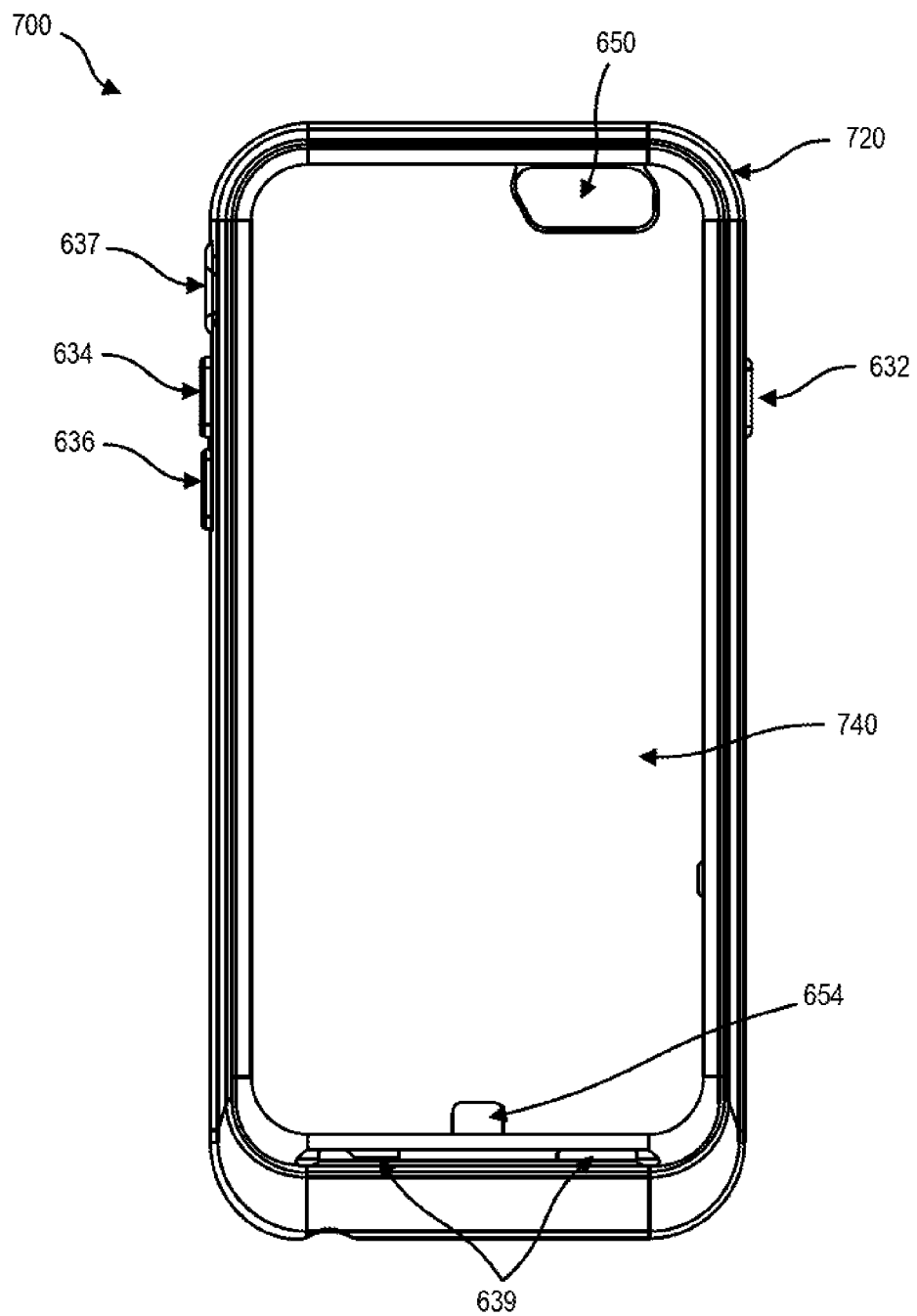
FIG. 14 illustrates a front view of a powered case for an electronic device.

FIG. 14 illustrates a front view of a powered case 700. Powered case 700 may include any of the feature, functions, or elements of protective case 100, protective case 200, protective case 300, protective case 400, case 500, and/or protective battery case 600.

Powered case 700 includes front member 720 and back member 740 (visible through a front opening or aperture in powered case 700 when an electronic device is not installed, as is illustrated in FIG. 14). Front member 720 includes a front surface and sides which engage back member 740 to form a cavity into which an electronic device, such as electronic device 170 or electronic device 270, may be placed. Front member 720 and back member 740 may partially or fully receive, encase, or enclose the electronic device.

Front member 720 can be made of any suitable material, including, but not limited to, polycarbonate (PC), high impact polystyrene (HIPS), nylon, fiberglass-filled nylon, acrylonitrile butadiene styrene (ABS), silicone, polypropylene, thermoplastic elastomer, polyoxymethylene (POM), polyethylene terephthalate (PET), ceramic, metallized ceramic, aluminum, aluminum alloy, titanium, wood, carbon fiber, and/or any combination thereof.

Some or all of the features of the electronic device may be accessible or usable while the electronic device is in powered case 700. Front member 720 includes an opening in the front surface of front member 720 for accessing the electronic device or for accessing an interactive touch screen or interactive control panel of the electronic device. The opening may or may not be covered by a membrane, film, or skin (not shown). When no membrane, film, or skin is present, the user is able to directly touch the interactive touchscreen display through the opening. If a membrane, film, or skin is included, it may be sufficiently thin and sufficiently optically transparent to allow the user to operate the touchscreen in a manner similar to how the device would be operated if the membrane, skin, or film was not present and the user was touching the device directly. In other words, the membrane, film, or skin may have little or no effect on the operation of the touchscreen by the user. The membrane, skin, or film may be included for purposes of protecting the display of the electronic device. In some situations, the membrane, skin, or film may be attached to or adhered to the electronic device rather than to front member 720. Alternatively or in addition to protecting the touchscreen from scratches or impact, the membrane, skin, or film may be included for sealing the protective case against damaging elements such as, for example, dirt, water, snow, dust, or chemicals.

Front member 720 may also include one or more other apertures or openings for accessing the electronic device or for accessing a port, connector, or other feature of the electronic device. One or more openings or apertures may exist on any side or surface of front member 720 or back member 740 for accessing a switch, a control, a port, a connector, or another feature of the electronic device.

In addition to apertures or openings, front member 720 and/or back member 740 may include one or more button features, such as button features 632, 634, 636, or 637. These features enable a user to operate a button or control of the electronic device while the electronic device is inside the protective cover without directly contacting the electronic device. The button features may be implemented using a variety of devices or structures.

In one example, button feature 632 is configured to engage a power switch of an encased electronic device. The button feature may be used to engage other types of switches of the electronic device. Button feature 632 may be designed to flex inward with respect to front member 720 and toward the inside of front member 720 when a user applies force to an outer surface of button feature 632, thereby permitting actuation of the power switch of the electronic device. Button feature 632 may be flexibly coupled to front member 720 by a flexible hinge or beam. In some configurations, the flexible hinge may be formed using a different material than the primary material used to form front member 720. During manufacturing, thin gates can be formed to permit flow of the second material to the area around button feature 632. The thin gates may be easily be broken by actuating button feature 632 during a first use. As a result, button feature 632 decouples entirely from front member 720 and stays attached to the second material, where it can easily be actuated by the user. Other methods of manufacture and other methods of flexibly attaching button feature 632 to front member 620 are possible. For example in other configurations, button feature 632 may be formed from a same material as front member 720.

Other types of button or control features are possible. For example, button feature 637 may include a pivoting element that pivots back and forth about an axis in response to pressure or force applied by a user. Button feature 637 transfers this pressure or force to the inside of powered case 700 and to the electronic device to actuate or toggle a switch. In one specific example, the electronic device includes a toggle switch for activating a feature of the electronic device, such as a silencing mode or feature. The toggle switch is operated by linearly applying pressure or force in one direction, and then in an opposing direction. Button feature 637 includes fingers that capture the toggle switch of the installed electronic device from both sides such that the rotational or pivoting motion is translate to a linear force to operate the toggle switch.

In contrast to button feature 632, button features 634 and 636 may be movable to engage a button or control feature of the electronic device inside powered case 700 without being attached to front member 720 in a fixed manner. For example, button feature 634 and/or button feature 636 may be a separate piece which is captured within constraint features of front member 720 such that the button feature freely moves relative to front member 720, within a range of movement. In other words, button features 634 and 636 may be loosely coupled to front member 720 to allow them to move enough relative to 720 to engage a button, switch, or control feature of an electronic device inside powered case 700. This configuration permits the button feature to move or be actuated with respect to front member 720 while still being contained by front member 720.

Button features 634 and 636 may be manufactured as separate pieces from front member 720 and have an interference fit with respect to an opening in front member 720 such that they are initially snapped or pushed into place with sufficient force to overcome the force of the constraint feature and stay constrained after being pushed or forced into place. Alternately, as discussed above with respect to button feature 632, button feature 634 and/or 636 may be formed as part of front member 720 with thin gates, which are broken upon initial use or post molding processing, that stay loosely coupled to powered case 700 within a range of movement afterward.

Back member 740 comprises an inner surface and one or more sides. Back member 740 couples with front member 720 to partially or fully capture, contain, encase, or enclose the electronic device. When inside powered case 700, the electronic device rests against the inner surface. Back member 740 may be made of any suitable material, including, but not limited to, polycarbonate (PC), high impact polystyrene (HIPS), nylon, fiberglass-filled nylon, acrylonitrile butadiene styrene (ABS), polypropylene, silicone, thermoplastic elastomer, polyoxymethylene (POM), polyethylene terephthalate (PET), ceramic, metallized ceramic, aluminum, aluminum alloy, titanium, wood, carbon fiber, and/or any combination thereof.

The inner surface of powered case 700 may also include a soft, compliant, or compressible material to further protect the electronic device from shock, scratching, impact, and/or vibration. The material may also reduce movement and/or rattling of the electronic device inside powered case 700 by applying a force to the electronic device inside powered case 700 in response to being compressed when the electronic device is installed. The soft, compliant, or compressible material may comprise a single piece or multiple pieces and may or may not be adhered to back member 740. In some configurations, a closed cell or open cell foam material may be used. Soft, compliant, or compressible materials may be attached to front member 720 in addition to or in place of back member 740 for similar purposes.

Front member 720 and back member 740 may be formed from materials having a same color or may be formed from materials having different colors to produce a contrast effect or to provide a matching or contrasting effect with the electronic device itself. In addition, one or more of front member 720 and back member 740 may receive a surface treatment to provide a different texture or feel to the surface. In one example, one or more of front member 720 and back member 740 may be painted with a soft touch paint to provide a soft, velvet, leathery, and/or rubbery feel. These types of treatments, finishes, or coatings may give the components increased grip, improved durability, improved scratch resistance, improved resilience to fingerprints, and/or other characteristics. In other examples, an outside surface of one or more of front member 720 and back member 740 may include one or more areas of a soft, tacky, or "grippy" material for purposes of reducing the chances that they may slip out of a user's hand or slide across a surface.

Back member 740 may also contain one or more button features, such as button features 632, 634, 636, and/or 637, depending on where buttons or control features are located on the electronic device. Different versions of powered case 700 may have button features, openings, and/or other features in various locations on front member 720 and/or back member 740 to correspond to locations of buttons, switches, control features, ports, cameras, displays, and/or other interfaces on a particular model of electronic device, portable electronic device, portable computing device, or mobile computing device.

Although not visible in FIG. 14, back member 740 may also contain one or more electrical components for implementing power related functions. For example, back member 740 may contain one or more of a battery, a supplemental power source, circuitry, timing circuitry, a switch, a charging interface, a user interface, a current monitor, any of the elements in FIGS. 2-4B, and/or any elements of computer 1200 of FIG. 12. Back member 740 may include one or more other electrical components, electronic components, electromechanical components, and/or printed circuit boards for implementing the electrical, electronic, and/or power features described herein. Back member 740 may comprise two or more structural components that are permanently or semi-permanently attached to each other during a manufacturing or assembly process to contain or enclose any of the electrical, electronic, or electromechanical components described herein in a cavity of back member 740. In some configurations, the electrical and/or electronic components may be permanently or semi-permanently enclosed in a cavity such that they are not visible, not accessible, and/or not easily accessible to a user. While the electrical components above are described as being contained in back member 740, some or all of them may also be included in front member 720, and/or another component of powered case 700, or a combination thereof.

Front member 720 and/or back member 740 may also contain an electrical connector, such as electrical connector 654, for interfacing any of the electrical components of the case to the electronic device. Electrical connector 654 is an example of switched electrical interface 218. In one example, electrical connector 654 may be an APPLE Lightning connector. In another example, electrical connector 654 may be USB connector, a mini USB connector, a micro USB connector, another variety of USB connector, a cylindrical connector, and/or a proprietary connector. When the electronic device is inserted into back member 740, electrical connector 654 may electromechanically interface with a connector or electrical interface of the electronic device. When powered battery case 700 is encasing or enclosing the electronic device, fully or partially, the electronic device is held in place as to stay engaged with electrical connector 654.

In addition to transmitting power to the electronic device, electrical connector 654 may be used to transmit data to the electronic device, to receive data from the electronic device, to transmit messages to the electronic device, to receive messages from the electronic device, to transmit control signals to the electronic device, and/or to receive control signals from the electronic device. Electrical connector 654 may be used, among other functions, to provide electrical power to the electronic device from a battery contained inside powered case 700 and/or from a power source external to powered case 700. In addition to being electrically interconnected to one or more electrical or electronic components of back member 740, electrical connector 654 may be electrically connected to an external electromechanical interface of back member 740 (not visible in FIG. 14). The electrical connection from electrical connector 654 to the external electromechanical interface may be a direct electrical connection and/or may be an indirect electrical connection through one or more of the electrical or electronic components of back member 740. Further, electrical connector 654 may contain circuitry or electrical components, other than electrical conductors, such as passive analog components, active analog components, passive digital components, active digital components, and/or other circuitry, such as authentication circuitry.

Although the various electrical and electronic features disclosed herein are primarily described as being included in back member 740, some or all of the electrical components and/or features may be contained in front member 720. In another variation, the electrical components and/or features may be distributed among front member 720, back member 740, and/or another element of case 700. In addition, one or more electrical interconnections may exist between front member 720 and back member 740 for purposes of passing electrical power or signals between front member 720 and back member 740.

Figure 15:
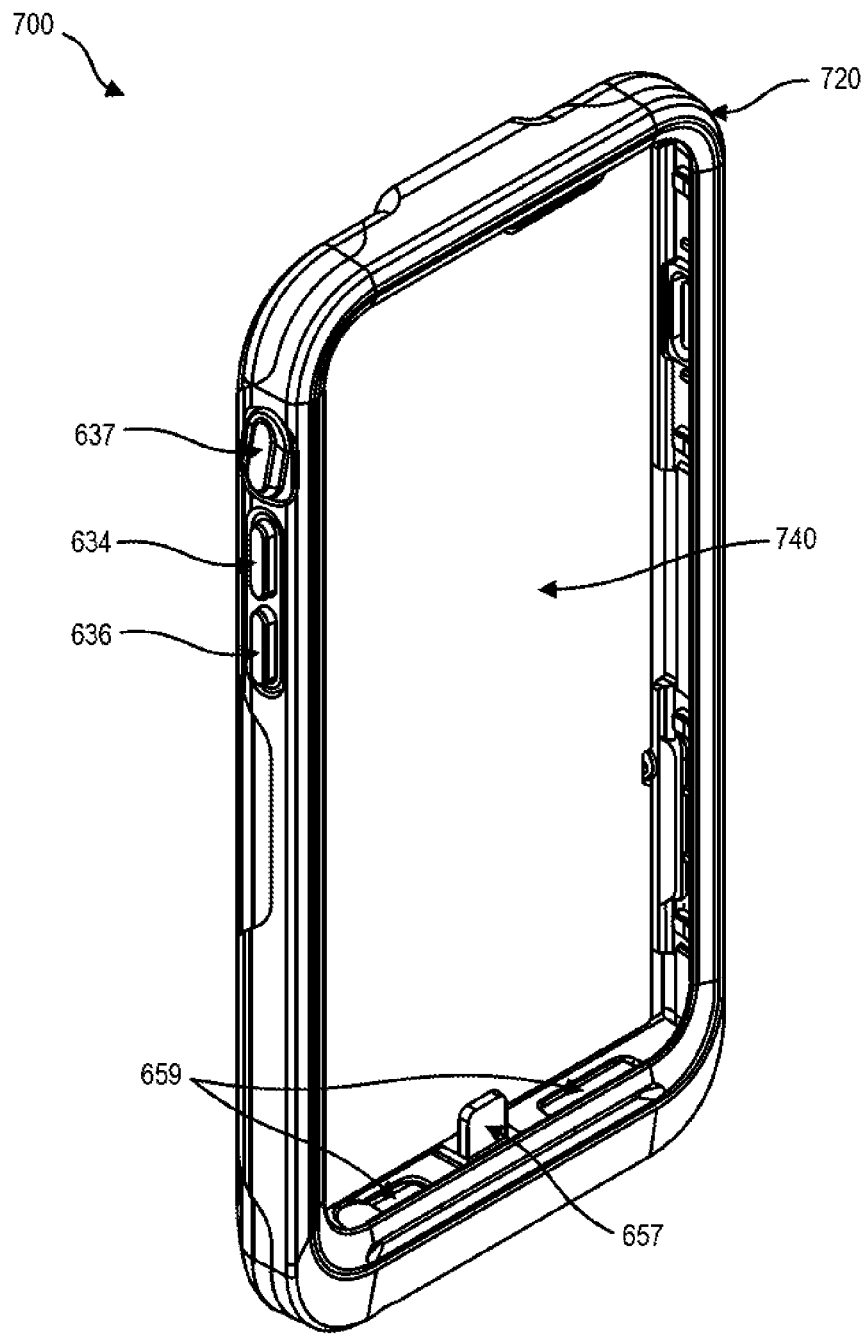
FIG. 15 illustrates a front perspective view of a powered case for an electronic device.
Figure 16:
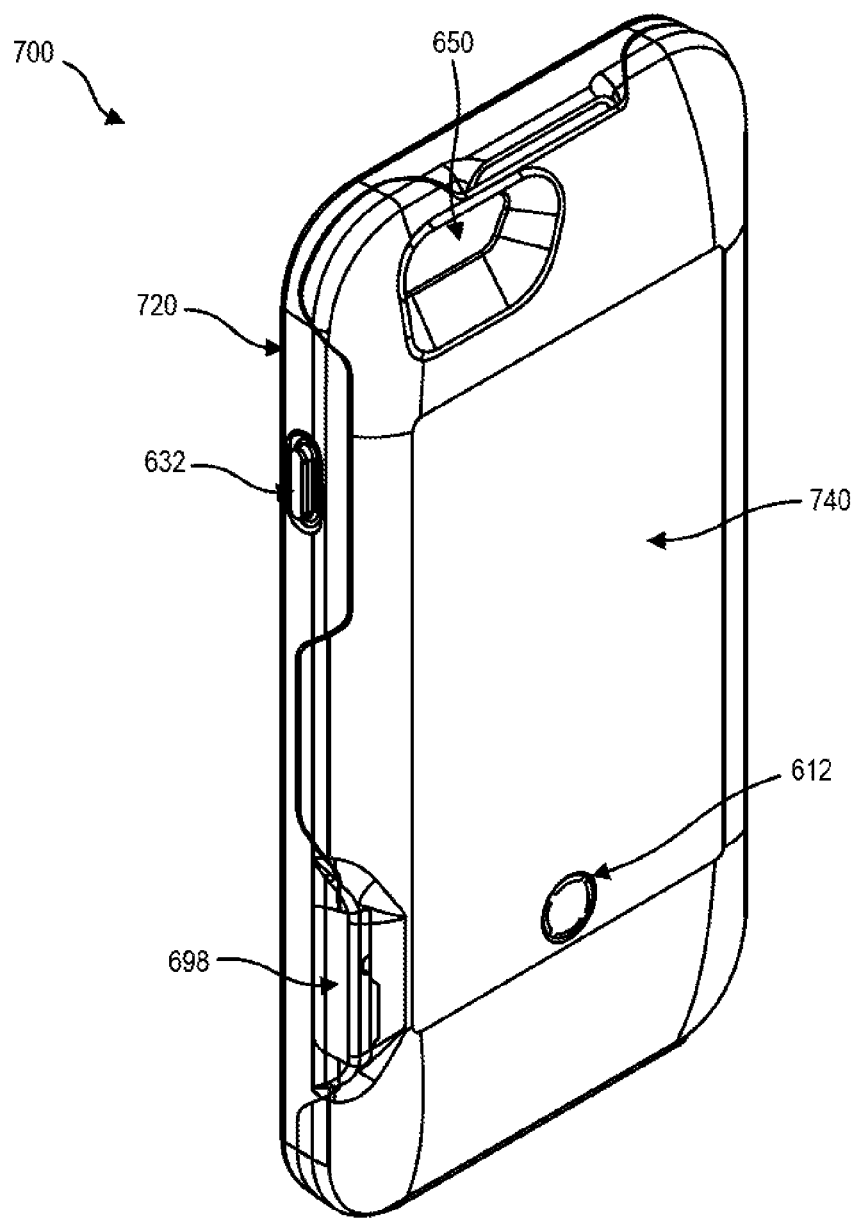
FIG. 16 illustrates a back perspective view of a powered case for an electronic device.

FIG. 15 illustrates a front perspective view of powered case 700 for an electronic device. FIG. 16 illustrates a back perspective view of powered case 700. Electromechanical button 612 is located on a back surface of member 740 in contrast to the location of a button performing a similar function in at least FIGS. 1, 6, and 8. As in other examples, button 612 may be a mechanical structure on an outer surface of powered case 700 that enables activation of an electrical switch inside the case. FIG. 16 also illustrates charging port door 698. Charging port door 698 is a cover over an electrical interface, such as charging interface 313 or external electrical interface 513, for providing electrical power and/or data communications from an external device to powered case 700. Charging port door 698 is pulled open, flipped open, hinged open, or otherwise removed to access an electrical connector that is behind or underneath charging port door 698. Charging port door 698 may provide protection to the electrical connector against water, fluids, dust, lint, dirt, snow, chemicals, or contaminants when the electrical connectors is not in use.

Figure 17:
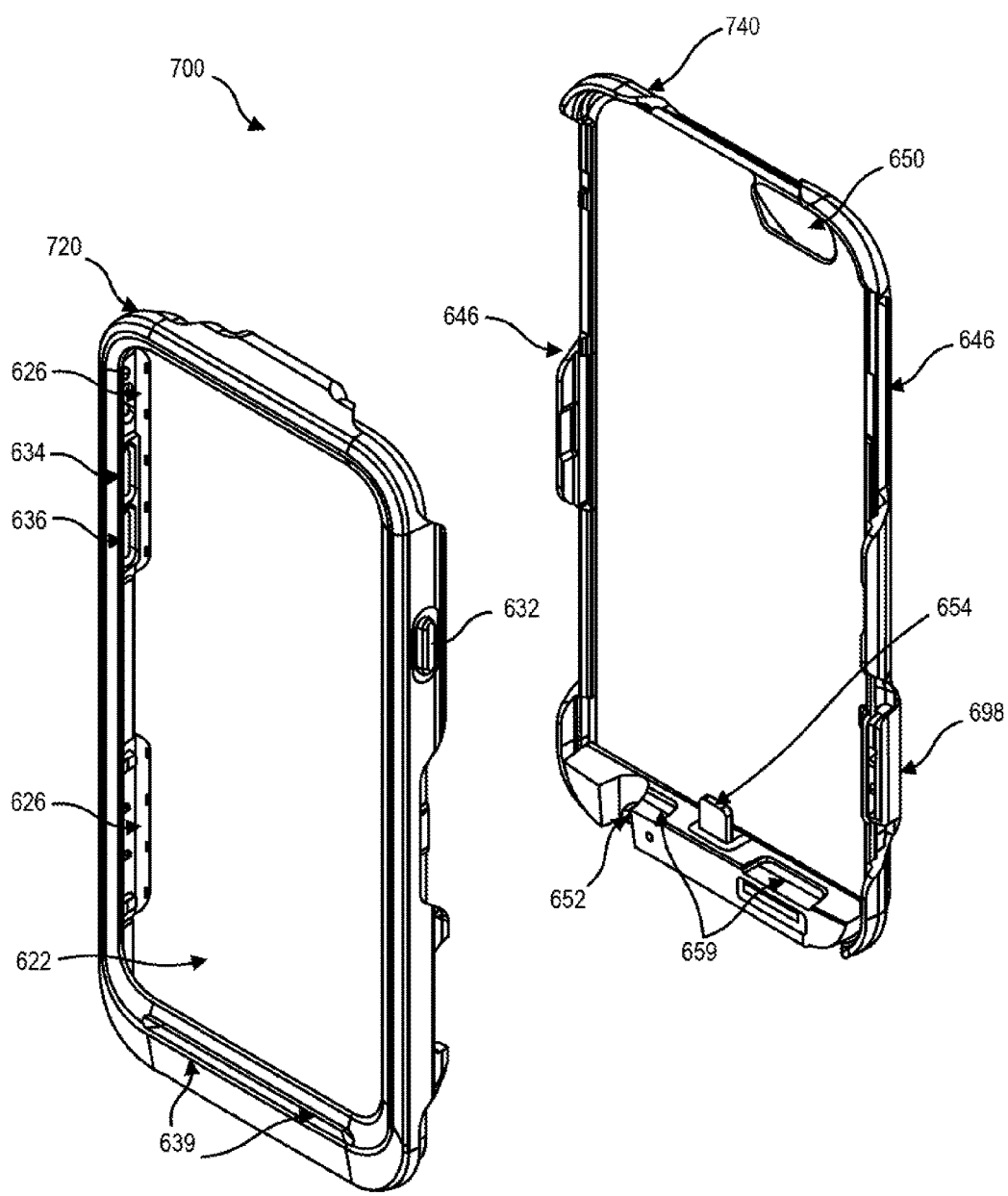
FIG. 17 illustrates a front perspective view of elements of a powered case for an electronic device.

FIG. 17 illustrates a front perspective view of power case 700 in a disassembled configuration. In FIG. 17 front member 720 and back member 740 are not clasped or attached together. In typical use, an electronic device would be inserted into back member 740 and front member 720 snapped onto back member 740 to at least partially enclose the electronic device inside the case.

Figure 18:
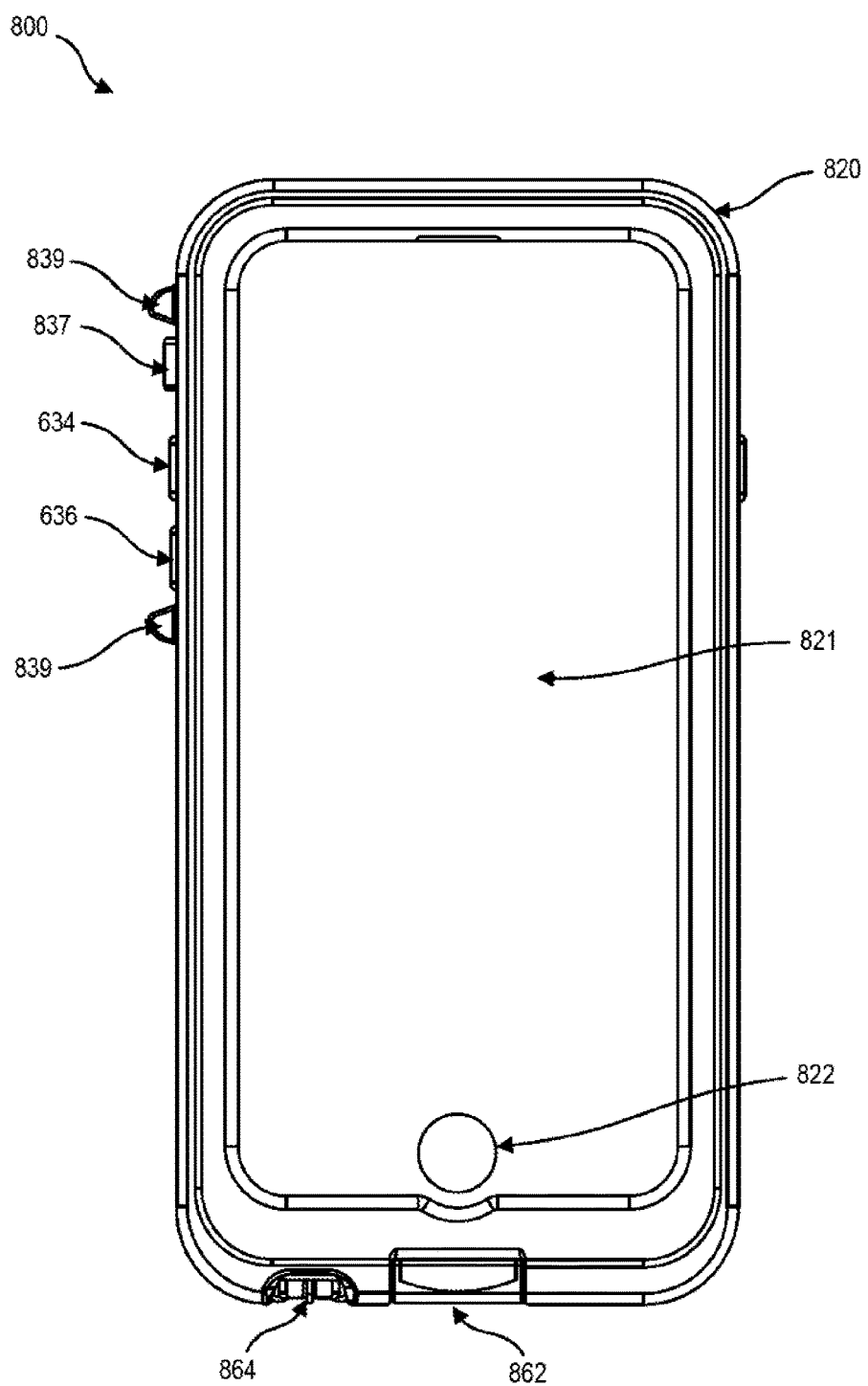
FIG. 18 illustrates a front view of a waterproof protective case for an electronic device.

FIG. 18 illustrates a waterproof protective case 800. Waterproof protective case 800 may include any of the feature, functions, or elements of protective case 100, protective case 200, protective case 300, protective case 400, case 500, protective battery case 600, and/or powered case 700.

Figure 19:
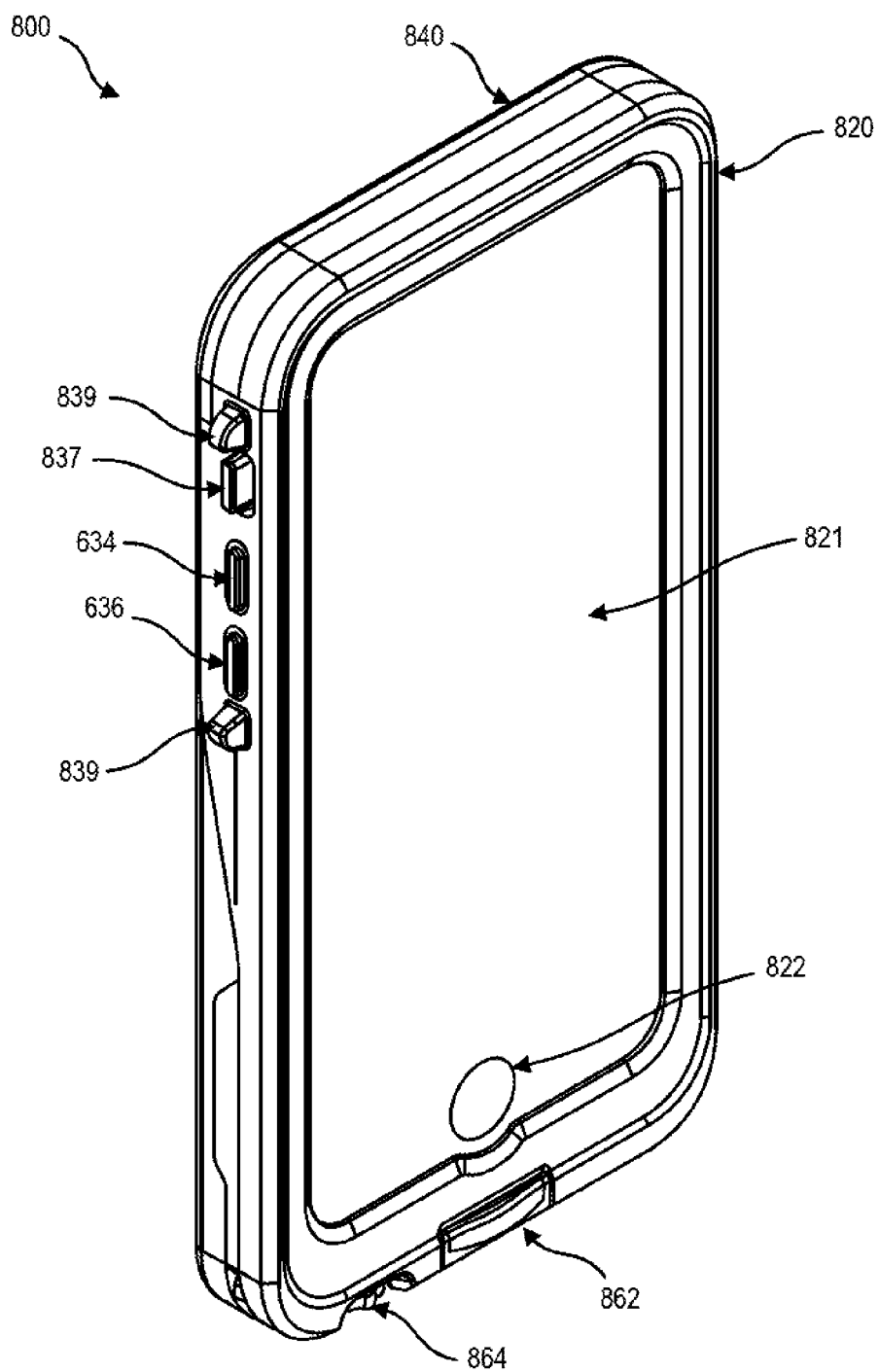
FIG. 19 illustrates a front perspective view of a waterproof protective case for an electronic device.

Waterproof protective case 800 includes first member 820. First member 820 may include any of the features, functions, or elements of front member 620 or front member 720. As illustrated in FIG. 19, first member 820 attaches to a second member 840 to form waterproof protective case 800. First member 820 and second member 840 receive and encase or enclose an electronic device. One or more gaskets, seals, o-rings, gaskets seats, and/or sealing surfaces may be used to seal first member 820 to second member 840 to form a waterproof cavity inside protective case 800 for the electronic device. In some configurations waterproof protective case 800 may only be waterproof to a specified water depth. In other configurations waterproof protective case 800 may be water resistant rather than being waterproof.

Some or all of the features of the electronic device may be accessible or usable while the electronic device is installed in or inside waterproof protective case 800. First member 820 includes an opening in the front surface of first member 820. The opening is covered by a membrane 821. Membrane 821 is a membrane, film, or skin. Membrane 821 is sufficiently thin and sufficiently optically transparent to allow a user to operate a touchscreen or interactive control panel of an electronic device inside the case in a manner similar to how the device would be operated if the membrane, skin, or film was not present and the user was touching the device directly. In other words, the membrane 821 may have little or no effect on the operation of the touchscreen by the user. However, in some configurations, membrane 821 may not be included and front member 820 may seal to a front surface of the electronic device or around a perimeter of the electronic device or around a perimeter of the touchscreen such that the touchscreen of the device is not covered with a membrane but the rest of the device is still protected from water or other liquids.

Membrane 821 may also include a reduced thickness area 822 for using a biometric sensor of the electronic device, such as a fingerprint reader or finger print scanner. The decreased thickness, relative to membrane 821, may be beneficial or necessary for the biometric scanner device to operate through the membrane. The biometric scanner device may be for turning on the electronic device, for accessing information on the electronic device, and/or for permitting certain functions to be performed on the electronic device.

In one configuration, reduced thickness area 822 may be an area of membrane 821 that is formed or otherwise manufactured to be thinner. In another configuration, reduced thickness area 822 may be a separate piece of material that is attached over a hole or opening in membrane 821. In yet another configuration, reduced thickness area 822 may have a different shape or location. In yet another configuration, reduced thickness area 822 may comprise a hole through membrane 821 and a perimeter of the hole or an area around the hole may otherwise seal to the electronic device to keep water from reaching other areas of the electronic device.

First member 820 may also include one or more other apertures or openings for accessing the electronic device. One or more openings or apertures may also exist on any side or surface of first member 820 or second member 840 for accessing a switch, a control, a port, a connector, or another feature of the electronic device.

In addition to apertures or openings, first member 820 and/or second member 840 may include one or more button features, such as button features 634 and 636. These features enable a user to operate a button or control of the electronic device inside the protective cover without directly contacting the electronic device. Beneficially, the electronic device is protected by the waterproof or water-resistant features of the case while still be operable inside the case. The button features may be implemented using a variety of devices or structures.

Other types of button or control features are possible. For example, button feature 837 is adapted for controlling or activating a sliding or toggling type switch on the electronic device. Button feature 837 may include a pivoting element that allows button feature 837 to pivots back and forth about an axis in response to pressure or force applied by a user. Button feature 837 transfers this pressure or force inside of waterproof protective case 800 to the switch of the electronic device. Button feature 837 may include features on an inside surface of first member 820 and/or second member 840 that capture the switch of the installed electronic device to allow it to be actuated in both directions.

Button features 634, 636, and/or 837 may be movable to engage a button or control feature of the electronic device inside waterproof protective case 800 without being attached to first member 820 in a fixed manner. For example, one or more of the button features may be a separate piece which is captured within constraint features of first member 820 such that the button feature freely moves relative to first member 820, within a range of movement. In other words, any of the button features may be loosely coupled to first member 820 to allow them to move enough relative to first member 820 to engage a button, switch, or control feature of an electronic device inside waterproof protective case 800. This configuration permits the button feature to move or be actuated with respect to first member 820 while still being contained by first member 820.

Any of the buttons or button features may be manufactured as separate pieces from first member 820 and/or have an interference fit with respect to an opening in first member 820 such that they are initially snapped or pushed into place with sufficient force to overcome the force of the constraint feature and stay constrained after being pushed or forced into place. Alternately, any of the button features may be formed as part of first member 820 with thin gates, which are broken upon initial use or post molding processing, that stay loosely coupled to waterproof protective case 800 within a range of movement afterward.

Waterproof protective case 800 further includes button guards 839 for protecting the button features of the case. Button guards 839 reduce the likelihood of the button features catching on something or inadvertently being pressed or activated when waterproof protective case 800 is slid into or out of a storage area, such as a person's pocket. Button guards 839 also reduce the likelihood of one of the button features being pressed if waterproof protective case 800 is pressed against a surface. Button guards 839 may also reduce wear and tear on the button features.

Waterproof protective case 800 also includes door 862. Door 862 provides access to an electrical connector, electrical interface, and/or electrical contacts of the electronic device without taking the electronic device out of waterproof protective case 800. Door 862 may be a hinged element, an element that pivots from the case, a threaded insert, or a plug that maintains the waterproof or water-resistant nature of waterproof protective case 800 when closed or inserted. Door 862 and/or waterproof protective case 800 may include one or more gaskets, seals, gasket seats, and/or gasket sealing surfaces for establishing a watertight closure. In some configurations, door 862 may be tethered to waterproof protective case 800 such that it is not misplaced or forgotten when not inserted.

Waterproof protective case 800 also includes bung 864 for accessing an electrical connector, electrical interface, and/or electrical contacts of the electronic device without taking the electronic device out of waterproof protective case 800. For example, bung 864 may provide access to a headphone jack of the electronic device. Bung 864 may be a threaded plug, a plug having an interference fit, a plug configured for a snap fit, or another device that maintains the waterproof or water-resistant nature of waterproof protective case 800 when inserted. Bung 864 and/or waterproof protective case 800 may include a gasket, a seal, a gasket seat, and/or a gasket sealing surface for forming a watertight connection or closure. In some configurations, bung 864 may be tethered to waterproof protective case 800. Door 862 and/or bung 864 may be located on a different portion of waterproof protective case 800 or may have a different shape.

FIG. 19 illustrates a front perspective view of waterproof protective case 800. Second member 840 is visible in FIG. 19. Second member 840 comprises an inner surface and one or more sides. Second member 840 couples with first member 820 to capture, contain, encase, or enclose the electronic device. When inside waterproof protective case 800, the electronic device rests against one or more inner surfaces of first member 820 and/or second member 840.

First member 820 and second member 840 may be formed from materials having a same color or may be formed from materials having different colors to produce a contrast effect. In addition, one or more of first member 820 and second member 840 may receive a surface treatment to provide a different texture or feel to the surface. In one example, one or more of first member 820 and second member 840 may be painted with a soft touch paint to provide a soft, velvet, leathery, and/or rubbery feel. These types of treatments, finishes, or coatings may give the components increased grip, improved durability, improved scratch resistance, improved resilience to fingerprints, and/or other characteristics. In other examples, an outside surface of one or more components of case 800 may include one or more areas of a soft, tacky, or grippy material for purposes of reducing chances that the case may slip out of a user's hand or slide across a surface.

The inner surface of waterproof protective case 800 may also include a soft, compliant, or compressible material to further protect the electronic device from shock, scratching, impact, and/or vibration. The material may also reduce movement and/or rattling of the electronic device inside waterproof protective case 800 by applying a force to the electronic device inside waterproof protective case 800 in response to being compressed when the electronic device is installed. The soft, compliant, or compressible material may comprise a single piece or multiple pieces and may or may not be adhered to second member 840. In some configurations, a closed cell or open cell foam material may be used. Soft, compliant, or compressible materials may be attached to first member 820 in addition to or in place of second member 840 for similar purposes, and in various instances, may be molded or comolded therewith.

Although not visible in FIG. 19, second member 840 may also contain one or more electrical components for implementing power related functions. For example, second member 840 may contain one or more of a battery, a power storage device, a supplemental power source, timing circuitry, a switch, a charging interface, a user interface, a current monitor, any element of FIGS. 2-4B, and/or any elements of computer 1200 of FIG. 12. Second member 840 may also include one or more other electrical components, electronic components, electromechanical components, and/or printed circuit boards for implementing the electrical, electronic, and/or power features described herein. Second member 840 may comprise two or more structural components that are permanently or semi-permanently attached to each other during a manufacturing or assembly process to contain or enclose any of the electrical, electronic, or electromechanical components described herein in a cavity of second member 840. In some configurations, the electrical and/or electronic components may be permanently or semi-permanently enclosed in a cavity such that they are not visible, not accessible, and/or not easily accessible to a user. Furthermore, second member may also protect the electrical and/or electronic components from water or fluids.

Figure 21:
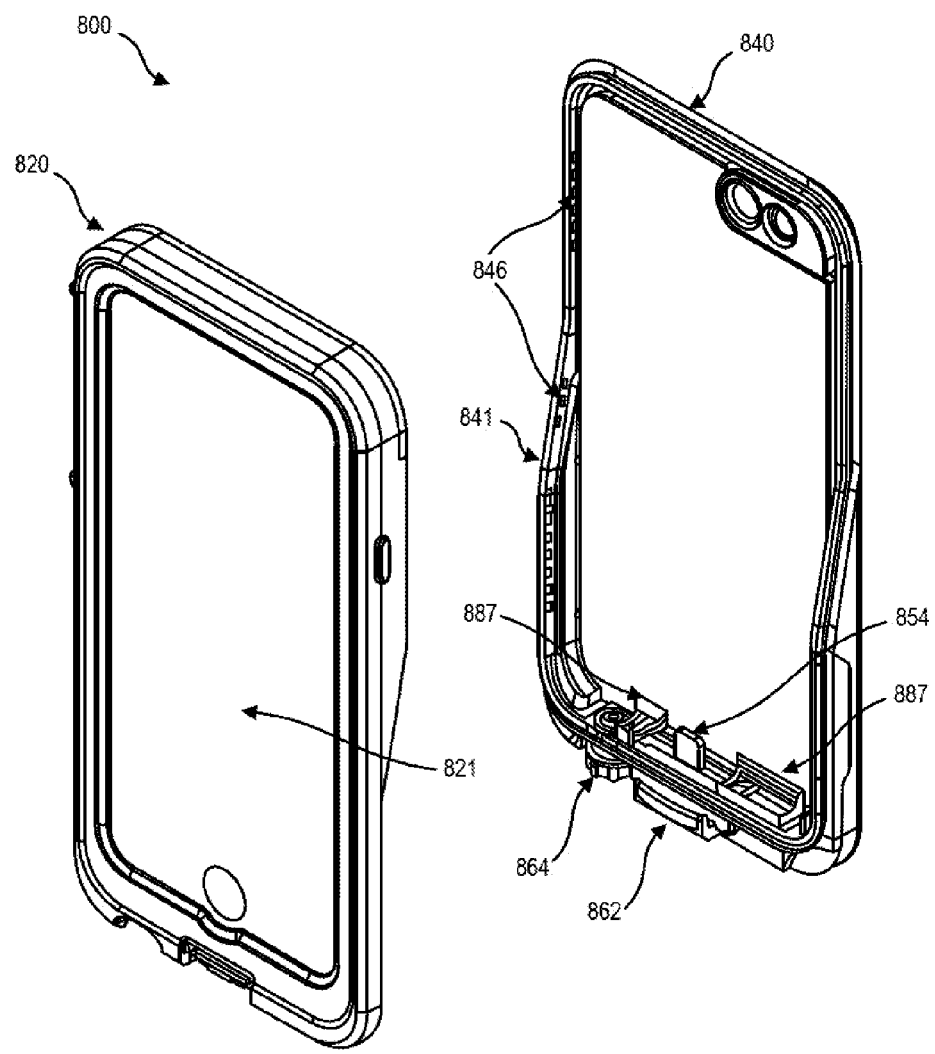
FIG. 21 illustrates a front perspective view of elements of a waterproof protective case for an electronic device.

Second member 840 may also contain an internal electrical connector, such as electrical connector 854 visible in FIG. 21, for interfacing any of the electrical components of waterproof protective case 800 to the electronic device. In one example, the internal electrical connector may be an APPLE Lightning connector. In another example, the internal electrical connector may be USB connector, a mini USB connector, a micro USB connector, another variety of USB connector, a cylindrical connector, and/or a proprietary connector. The internal electrical connector may electromechanically interface with a connector or electrical interface of the electronic device.

In addition to transmitting power to the electronic device, electrical connector 864 may be used to transmit data to the electronic device, receive data from the electronic device, to transmit messages to the electronic device, receive messages from the electronic device, transmit control signals to the electronic device, and/or receive control signals from the electronic device. Electrical connector 854 may be used, among other functions, to provide electrical power to the electronic device from a battery contained inside waterproof protective case 800 and/or from a power source external to waterproof protective case 800. In addition to being electrically interconnected to one or more electrical or electronic components of second member 840, electrical connector 854 may be electrically connected to an external electromechanical interface of second member 840. The electrical connection from electrical connector 854 to the external electromechanical interface may be a direct electrical connection and/or may be an indirect electrical connection through one or more of the electrical or electronic components of second member 840. Further, electrical connector 854 may contain circuitry or electrical components, other than electrical conductors, such as passive analog components, active analog components, passive digital components, active digital components, and/or other circuitry, such as authentication circuitry.

Although the various electrical and electronic features disclosed herein are primarily described as being included in second member 840, some or all of the electrical components and/or features may be contained in first member 820. In another variation, the electrical components and/or features may be distributed among first member 820, second member 840, and/or another element of case 800. In addition, one or more electrical interconnections may exist between first member 820, second member 840, and/or another element of case 800 for purposes of transmitting electrical signals or electrical power between these components.

Second member 840 may also contain one or more button features depending on where buttons or control features are located on the electronic device. Different versions of waterproof protective case 800 may have button features, openings, and/or other features in various locations on first member 820 and/or second member 840 to correspond to locations of buttons, switches, control features, ports, cameras, displays, and/or other interfaces on a particular model of electronic device, portable electronic device, portable computing device, or mobile computing device.

Figure 20:
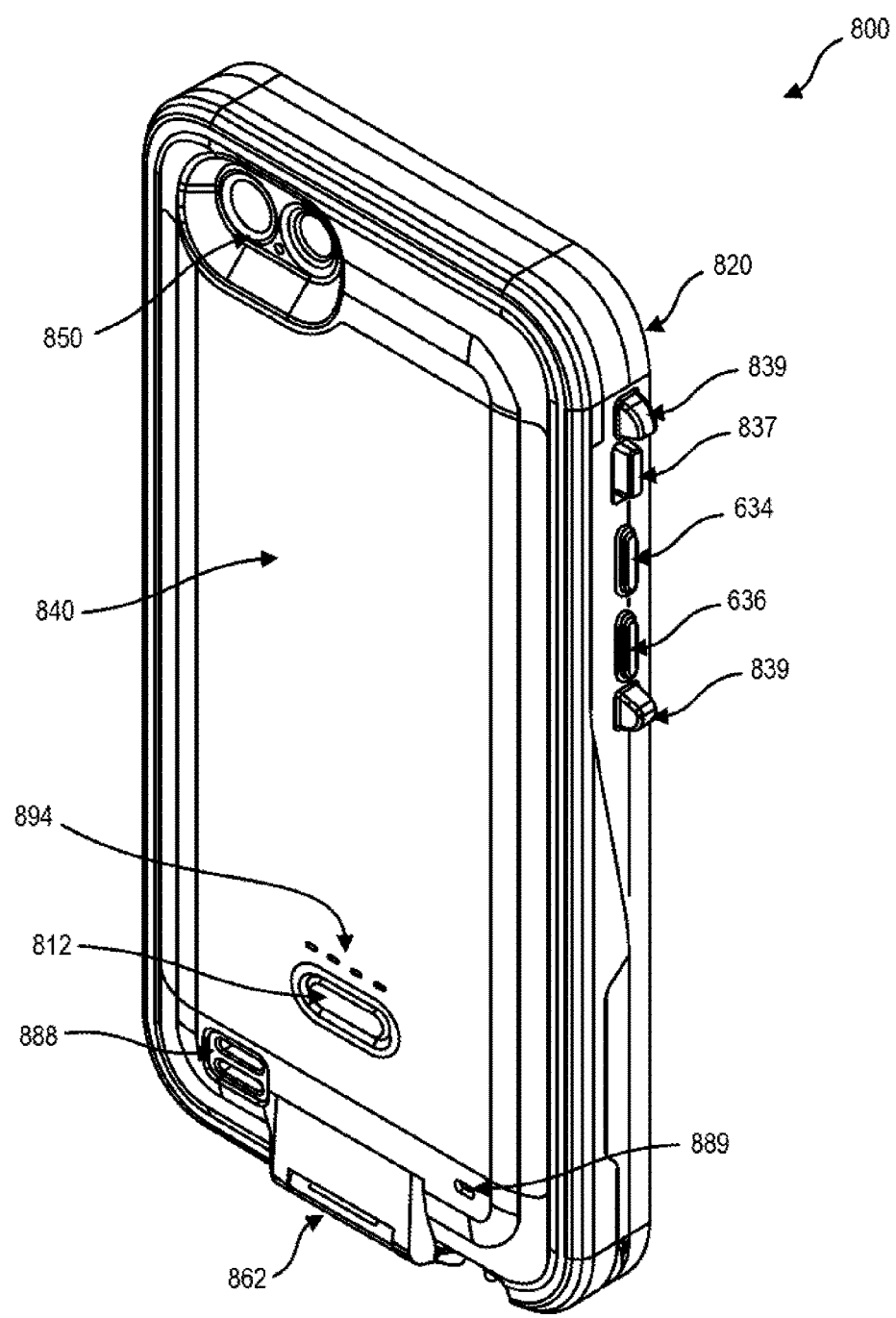
FIG. 20 illustrates a back perspective view of a waterproof protective case for an electronic device.

FIG. 20 illustrates a back perspective view of waterproof protective case 800 for an electronic device. Second member 840 includes opening 850 for a camera and/or flash feature of an electronic device inside waterproof protective case 800. Opening 850 is an example of opening 650. In some configurations, there may be separate openings for each of the camera, flash, and/or other features of the electronic device. In some configurations, opening 850 may include a transparent, or mostly transparent, membrane or film for maintaining the waterproof or water-resistant characteristics of waterproof case 800. In other examples, waterproof protective case 800 may include a gasket or other sealing features in proximity to opening 850 such that second member 840 seals to a back surface of the electronic device enabling the waterproof or water-resistant characteristics to be maintained while not requiring a membrane or film over opening 850. In other words, in the latter example, the camera and/or flash features may not be covered by a film but the electronic device is still otherwise protected from water, dust, or other damaging elements by waterproof protective case 800.

Waterproof protective case 800 also includes button 812. Button 812 may contain any of the features, elements, or functions of user input 117, user interface 317, and/or electromechanical button 612. Button 812 may be used for starting charging, stopping charging, checking status, or controlling operation of waterproof protective case 800 in another fashion in accordance with any of the other examples or descriptions provided herein. Waterproof protective case 894 also includes indicators 894. Indicators 894 include any type of visual or optical indicator for indicating a state, condition, mode, or status of waterproof protective case 800. Indicators 894 may include a light source, such as an LED, and/or may include a light pipe for conducting light or other visual information from another location, such as from an LED on a printed circuit board inside waterproof protective case 800. Other types of indicators are possible including liquid crystal display elements, e-ink display elements, or any other elements capable of conveying a status or a mode to a user.

Waterproof protective case 800 includes microphone opening 889 and speaker opening 888 for conducting audio to/from the electronic device inside of waterproof protective case 800. These opening enable a user to make use of the audio features of the electronic device even though it is enclose in waterproof protective case 800. Microphone 889 and/or speaker opening 889 may be covered with a water-resistant or water impermeable material, such as GORE-TEX, PTFE, or a micro porous material, that allows sound and/or air to pass between the outside and the inside of waterproof protective case 800 while maintaining some or all of the water-resistant or waterproof characteristics of the case. In some examples, there may be more or fewer openings on waterproof protective case 800 and/or the openings may be at other locations on case 800.

FIG. 21 illustrates a front perspective view of elements of waterproof protective case 800 for an electronic device. In FIG. 21, first member 820 and second member 840 are not clasped or attached together. In typical use, an electronic device would be inserted into second member 840 and first member 820 snapped onto second member 840 to enclose the electronic device and form the waterproof or water-resistant covering for the electronic device. Second member 840 includes audio channels 887 for conducting audio from a speaker and/or microphone on the bottom of the electronic device to openings 888 and/or 889 that are on the back surface of second member 840 (as illustrated in FIG. 20). Each of channels 887 may be a trough, cutout, recess, waveguide, or other air path that is not occupied by the electronic device when the electronic device is installed in the case such that sound can travel through the trough, cutout, recess, or waveguide from one location to another along an inside surface of the case. In some configurations, one or more of the audio paths may be a waveguide having a cross section that changes in size a long a length of the waveguide in order to change one or more characteristics of audio traveling through the waveguide, such as causing an amplifying effect on the audio.

FIG. 21 also illustrates clasping features 846 for clasping or attaching second member 840 to first member 820. Clasping features 846 engage and/or mate with clasping features on first member 820. The clasping features hold first member 820 and second member 840 together until sufficient force is applied to overcome the clasping features and non-destructively pull them apart. Clasping features 846 may include any kind of clip, snap, fastener, latch, tab, cantilever snap joint, cantilever hook, compressive hook, torsion snap joint, annular snap joint, cylindrical snap joint, bayonet finger, trap, ball and socket, groove, finger, detent, hook and loop fastener, and/or other permanent or semi-permanent retention mechanism for holding the two members together.

FIG. 21 also illustrates ridge 841 on second member 840 which extends around a perimeter edge of second member 840. Ridge 841 is configured for interfacing to a gasket, channel, slot, o-ring, and/or seal along a corresponding perimeter edge of first member 820 for forming the watertight seal between the two members. In some examples, second member 840 may include a gasket, channel, slot, and/or seal in addition to or in place of including those elements on first member 820.

The elements, components, and steps described herein are meant to exemplify some types of possibilities. In no way should the aforementioned examples limit the scope of the invention, as they are only exemplary embodiments.

As used herein, the term "about" in quantitative terms refers to plus or minus 5%. For example, "about 20%" would encompass 15-25% and "about 80%" would encompass 75-85%, inclusive. Moreover, where "about" is used herein in conjunction with a quantitative term it is understood that in addition to the value plus or minus 5%, the exact value of the quantitative term is also contemplated and described. For example, the term "about 5%" expressly contemplates, describes, and includes exactly 5%.

The phrases "in some embodiments," "according to some embodiments," "in the embodiments shown," "in other embodiments," "in some examples," "on other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective cover for an electronic device having a rechargeable battery and an interactive control panel, the protective cover comprising:
   a protective shell having a front, a back, and at least two sides, the protective shell including a cavity defined by the front, the back, and the at least two sides, the cavity at least partially enclosing the electronic device when the electronic device is installed in the protective shell, the protective shell including an opening on the front of the protective shell for accessing the interactive control panel of the installed electronic device;
   an external electrical interface accessible at an outside surface of one of the at least two sides of the protective shell, the external electrical interface for receiving electrical power from an external power source;
   an internal electrical interface accessible inside the cavity, the internal electrical interface for connecting to the electronic device when the electronic device is installed in the protective shell;
   one or more rechargeable batteries contained in the protective shell;
   a user input device accessible on the outside surface of the protective shell; and
   electrical circuitry electrically interconnected to the external electrical interface, the internal electrical interface, the one or more rechargeable batteries, and the user input device, the electrical circuitry having a charging mode and a non-charging mode, the electrical circuitry configured to transition from the non-charging mode to the charging mode in response to an input received at the user input device, the electrical circuitry further configured for:

transferring stored electrical power of the one or more rechargeable batteries of the protective cover to the installed electronic device through the internal electrical interface if the electrical circuitry is in the charging mode and if the protective case is not receiving the electrical power from the external power source through the external electrical interface, the transferring of the stored electrical power of the one or more rechargeable batteries limited by an amount of current the installed electronic device will consume;

transitioning from the charging mode to the non-charging mode in response to the amount of the current the installed electronic device will consume decreasing below a threshold value; and transferring the electrical power received from the external power source to the one or more rechargeable batteries of the protective cover and to the installed electronic device if the protective case is receiving the electrical power from the external power source.

2. The protective cover of claim 1, wherein the threshold value is an amount of current the electronic device consumes after the rechargeable battery of the electronic device has been fully charged.

3. The protective cover of claim 1, wherein the user input device comprises a button accessible on the protective shell.

4. The protective cover of claim 3, wherein the button includes one or more optical elements that are illuminated when the electrical circuitry of the protective cover is transitioned to the charging mode.

5. The protective cover of claim 4, wherein the one or more optical elements include light pipes that optically conduct light generated by one or more light emitting diodes (LEDs) included in the electrical circuitry.

6. The protective cover of claim 1 further comprising one or more optical elements configured for indicating a charge state of the one or more rechargeable batteries of the protective cover.

7. The protective cover of claim 1, wherein the electrical circuitry includes a microprocessor.

8. The protective cover of claim 1 further comprising communication circuitry for exchanging electronic data communications with the electronic device.

9. The protective cover of claim 8, wherein the electronic data communications are exchanged with the electronic device through the internal electrical interface.

10. The protective cover of claim 8, wherein the communication circuitry includes an antenna and the electronic data communications are exchanged between the protective cover and the electronic device using a wireless data connection established between the communication circuitry of the protective cover and the electronic device.

11. The protective cover of claim 10, wherein the wireless data connection comprises a Bluetooth Low Energy™ connection.

12. A case for an electronic device having a rechargeable battery and a touchscreen, the case comprising:

a front member including an aperture for interacting with the touchscreen of the electronic device when the electronic device is installed in the case; and a back member attachable to the front member with one or more clasping mechanisms to at least partially enclose the electronic device in the case, the back member comprising:

a rechargeable power cell;

a switched electrical interface electrically interconnected to the electronic device when the electronic device is installed in the case, the switched electrical interface for providing electrical current from the rechargeable power cell of the case to the installed electronic device, the switched electrical interface switchable between an enabled mode and a disabled mode, the enabled mode permitting the electrical current to flow from the rechargeable power cell of the case through the switched electrical interface to the installed electronic device, the disabled mode not permitting the electrical current to flow from the rechargeable power cell through the switched electrical interface to the installed electronic device;

an electromechanical switch that can be actuated from an outside surface of the case, wherein the case transitions the switched electrical interface from the disabled mode to the enabled mode in response to actuation of the electromechanical switch; and monitoring circuitry for:

monitoring a magnitude of the electrical current flowing from the rechargeable power cell of the case through the switched electrical interface to the installed electronic device in the enabled mode and for automatically toggling the switched electrical interface from the enabled mode to the disabled mode when the magnitude of the electrical current decreases at least to a predetermined value, the predetermined value associated with an amount of externally supplied current the installed electronic device will consume when the rechargeable battery of the electronic device is substantially charged; and monitoring a current charge level of the rechargeable power cell of the case and automatically toggling the switched electrical interface from the enabled mode to the disabled mode when the current charge level of the rechargeable power cell decreases below a threshold value.

13. The case of claim 12, the case further comprising:

an input power interface on an outside surface of the case, the input power interface for receiving electrical power from an external power source;

charging circuitry electrically interconnected to the rechargeable power cell of the case for charging the rechargeable power cell; and control circuitry for providing a portion of the electrical power received from the external power source to the switched electrical interface for transfer to the installed electronic device and for simultaneously providing a remaining portion of the received electrical power to the charging circuitry for charging the rechargeable power cell of the case.

14. The case of claim 12, wherein the electromechanical switch comprises a momentary contact button.

15. The case of claim 12, wherein the predetermined value is associated with the rechargeable battery of the electronic device being 100% charged.

16. The case of claim 12, wherein the predetermined value is associated with the rechargeable battery of the electronic device being 95% charged.

17. The case of claim 12, wherein the predetermined value is associated with the rechargeable battery of the electronic device being 90% charged.

18. The case of claim 12, wherein the electromechanical switch includes one or more optical elements that illuminate to indicate a charging status of the case when the case transitions to the enabled mode.

19. The case of claim 13, wherein the control circuitry includes a microprocessor or a microcontroller.

20. The case of claim 12, wherein:
the front member includes a transparent membrane covering the aperture; and
the front member seals to the back member to form a waterproof cavity for the installed electronic device.

21. The case of claim 12 further comprising communication circuitry for exchanging data communications with the electronic device.

22. The case of claim 21, wherein the data communications are exchanged with the electronic device through a Bluetooth Low Energy™ wireless data connection established between the case and the electronic device.

23. A protective cover for a portable computing device, the protective cover comprising:
a protective shell that at least partially encloses the portable computing device;
an external electrical connector accessible on an outside surface of the protective shell, the external electrical connector for receiving electrical power from an external power source;
an internal electrical connector on an inside surface of the protective shell, the internal electrical connector for electrically interfacing with the installed portable computing device;
a rechargeable power storage device housed in the protective shell and removable from the protective shell;
a button accessible on the outside surface of the protective shell; and
control circuitry electrically interfaced to the external electrical connector, the internal electrical connector, the rechargeable power storage device, and the button, the control circuitry having at least a charging mode and a standby mode, the control circuitry adapted to:
if the protective cover is receiving the electrical power from the external power source, allocate the received electrical power among the rechargeable power storage device of the protective cover and the portable computing device, wherein a first portion of the received electrical power is transferred to the portable computing device and a second portion of the received electrical power is transferred to the rechargeable power storage device to recharge the rechargeable power storage device;
if the protective cover is not receiving the electrical power from the external power source and if the control circuitry is in the charging mode, transfer stored electrical power from the rechargeable power storage device of the protective cover to the installed portable computing device through the internal electrical connector, the transfer limited by an amount of current the installed portable computing device will consume, the control circuitry further adapted to transition from the charging mode to the standby mode when the amount of the current the portable computing device will consume drops below a threshold amount of electrical current the portable computing device consumes when the portable computing device is fully charged; and
if the protective cover is not receiving the electrical power from the external power source and if the control circuitry is in the standby mode, transition from the standby mode to the charging mode in response to detecting actuation of the button.

24. The protective cover of claim 23, wherein the protective cover is water-resistant.

25. The protective cover of claim 23, wherein the control circuitry is further adapted to automatically transition from the charging mode to the standby mode in response to the portable computing device being fully charged.

26. The protective cover of claim 25, wherein the control circuitry includes a microprocessor.

27. The protective cover of claim 25 further comprising communication circuitry for receiving data communications from the portable computing device.

28. The protective cover of claim 27, wherein the control circuitry is further adapted to determine that the portable computing device is fully charged based on information received in the data communications from the portable computing device.

29. The protective cover of claim 27, wherein the communication circuitry includes an antenna and receives the data communications from the portable computing device wirelessly via the antenna.

* * * * *